(12) United States Patent
Inomoto

(10) Patent No.: US 10,678,031 B2
(45) Date of Patent: Jun. 9, 2020

(54) ZOOM LENS, IMAGE PICKUP APPARATUS INCLUDING THE ZOOM LENS, AND IMAGE PICKUP SYSTEM INCLUDING THE ZOOM LENS

(71) Applicant: CANON KABUSHIKI KAISHA, Tokyo (JP)

(72) Inventor: Yu Inomoto, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 29 days.

(21) Appl. No.: 15/952,725

(22) Filed: Apr. 13, 2018

(65) Prior Publication Data

US 2018/0299652 A1 Oct. 18, 2018

(30) Foreign Application Priority Data

Apr. 17, 2017 (JP) ................. 2017-081259

(51) Int. Cl.
| | | |
|---|---|---|
| *G02B 13/02* | (2006.01) | |
| *G02B 27/00* | (2006.01) | |
| *G02B 9/64* | (2006.01) | |
| *G02B 15/173* | (2006.01) | |
| *G02B 27/42* | (2006.01) | |

(52) U.S. Cl.
CPC ............ *G02B 13/02* (2013.01); *G02B 9/64* (2013.01); *G02B 15/173* (2013.01); *G02B 27/0025* (2013.01); *G02B 27/4211* (2013.01)

(58) Field of Classification Search
CPC ........ G02B 13/02; G02B 13/18; G02B 13/04; G02B 13/24; G02B 13/009; G02B 13/0045; G02B 9/60; G02B 9/34; G02B 9/64; G02B 15/173; G02B 15/20; G02B 15/22; G02B 15/163; G02B 15/14; G02B 15/177; G02B 27/0025; G02B 27/4211; G02B 27/64; G02B 27/646
USPC ....... 359/695, 557, 763, 764, 772, 773, 766, 359/684, 657–662, 686, 693, 713, 714, 359/750–757
See application file for complete search history.

(56) References Cited

U.S. PATENT DOCUMENTS

| | | |
|---|---|---|
| 9,264,638 B2 | 2/2016 | Nakamura et al. |
| 9,268,120 B2 | 2/2016 | Shimomura et al. |
| (Continued) | | |

FOREIGN PATENT DOCUMENTS

| | | |
|---|---|---|
| JP | H9-211329 A | 8/1997 |
| JP | H10-148757 A | 6/1998 |

*Primary Examiner* — Jie Lei
(74) *Attorney, Agent, or Firm* — Carter, DeLuca & Farrell LLP

(57) ABSTRACT

Provided is a zoom lens comprising, in order from an object side to an image side, a first lens unit having a positive refractive power, a second lens unit having a negative refractive power, and a rear unit including at least one lens unit, in which the second lens unit is configured to move during zooming, an interval between each pair of adjacent lens units is changed during zooming, the rear unit has a positive refractive power over an entire zoom range, and the first lens unit includes a diffraction surface formed at a cemented surface of two optical elements cemented to each other. A focal length of the first lens unit, an amount of movement of the second lens unit during zooming from a wide angle end to a telephoto end and a back focus at the wide angle end are appropriately set.

17 Claims, 13 Drawing Sheets

(56) References Cited

U.S. PATENT DOCUMENTS

| | | |
|---|---|---|
| 9,291,800 B2 | 3/2016 | Inomoto et al. |
| 9,310,592 B2 | 4/2016 | Wakazono et al. |
| 9,715,092 B2 | 7/2017 | Inomoto |
| 2006/0221460 A1* | 10/2006 | Saruwatari ............ G02B 15/173 359/676 |
| 2009/0251781 A1* | 10/2009 | Adachi ................ G02B 15/161 359/557 |
| 2011/0176224 A1* | 7/2011 | Sato ..................... G02B 15/173 359/683 |
| 2017/0293123 A1 | 10/2017 | Kuwashiro et al. |

* cited by examiner

ZOOM LENS, IMAGE PICKUP APPARATUS INCLUDING THE ZOOM LENS, AND IMAGE PICKUP SYSTEM INCLUDING THE ZOOM LENS

BACKGROUND OF THE INVENTION

Field of the Invention

The present invention relates to a zoom lens and an image pickup apparatus including the zoom lens, which are suitable for an image pickup optical system, such as a digital camera, a video camera, a broadcasting camera, a monitoring camera, or a silver-halide film camera.

Description of the Related Art

An image pickup optical system for use in an image pickup apparatus is required to be a zoom lens having a short total lens length, a small size as a whole, and a high zoom ratio. Further, the image pickup optical system is desired to have, for example, high optical performance over the entire zoom range. As a zoom lens having a high zoom ratio and a small size as a whole, there is known a so-called positive lead-type zoom lens including, in order from an object side to an image side, a first lens unit having a positive refractive power and a second lens unit having a negative refractive power. The second lens unit serves as a main magnification lens unit.

When the positive lead-type zoom lens is increased in zoom ratio while the zoom lens is downsized as a whole, a large amount of axial chromatic aberration is caused in the first lens unit. In particular, a large amount of axial chromatic aberration is caused at a telephoto end. There is known a zoom lens using a diffractive optical element in an optical path in order to reduce occurrence of chromatic aberrations such as axial chromatic aberration and lateral chromatic aberration in such a zoom lens (Japanese Patent Application Laid-Open No. H9-211329 and Japanese Patent Application Laid-Open No. H10-148757).

In Japanese Patent Application Laid-Open No. H9-211329, there is disclosed a zoom lens including, in order from an object side to an image side, first to third lens units having positive, negative, and positive refractive powers. In the zoom lens, the first lens unit or the second lens unit includes the diffractive optical element. In Japanese Patent Application Laid-Open No. H10-148757, there is disclosed a positive lead-type zoom lens including, in order from an object side to an image side, first to fourth lens units having positive, negative, positive, and positive refractive powers, or first to fifth lens units having positive, negative, positive, negative, and positive refractive powers. In the positive lead-type zoom lens, the first lens unit or the second lens unit includes the diffractive optical element.

When the diffractive optical element is used in the positive lead-type zoom lens, it becomes easy to obtain a high zoom ratio and high optical performance while downsizing the entire system of the zoom lens. However, in order to obtain those effects, it is important to appropriately set, for example, a zoom type, a lens unit in which the diffractive optical element is arranged, power (reciprocal of a focal length) of the diffractive optical element, and refractive powers and lens configurations of respective lens units.

In particular, in the above-mentioned positive lead-type zoom lens, in order to satisfactorily correct the chromatic aberrations while downsizing the entire system of the zoom lens and increasing the zoom ratio, it is important to appropriately set the refractive power of the first lens unit. It is also important to appropriately set, for example, the refractive power of the second lens unit, which serves as the main magnification lens unit, an amount of movement of the second lens unit during zooming, and the configuration of the diffractive optical element.

For example, when the diffractive optical element is applied to the first lens unit in order to reduce the chromatic aberrations at the telephoto end, and the first lens unit is moved greatly toward the object side during zooming in order to achieve a high zoom ratio, the total lens length at the telephoto end is increased, and the zoom lens is increased in size as a whole.

SUMMARY OF THE INVENTION

The present invention has an object to provide a zoom lens having a small size as a whole, having a high zoom ratio, being capable of satisfactorily correcting chromatic aberrations over the entire zoom range, and having high optical performance, and to provide an image pickup apparatus including the zoom lens.

The zoom lens according to the present invention includes, in order from an object side to an image side, a first lens unit having a positive refractive power, a second lens unit having a negative refractive power, and a rear unit including at least one lens unit, in which the second lens unit is configured to move during zooming, an interval between each pair of adjacent lens units is changed during zooming, the rear unit has a positive refractive power over an entire zoom range, the first lens unit includes a diffraction surface formed at a cemented surface of two optical elements cemented to each other, and the following conditional expressions are satisfied:

$$1.00 < f1/m2 < 1.75; \text{ and}$$

$$0.05 < BFw/f1 < 0.15,$$

where f1 represents a focal length of the first lens unit, m2 represents an amount of movement of the second lens unit during zooming from a wide angle end to a telephoto end, and BFw represents a back focus at the wide angle end.

Further features of the present invention will become apparent from the following description of exemplary embodiments with reference to the attached drawings.

DESCRIPTION OF THE EMBODIMENTS

Now, a zoom lens and an image pickup apparatus including the zoom lens according to an embodiment of the present invention are described by way of Examples with reference to the drawings. The zoom lens according to this embodiment includes, in order from an object side to an image side, a first lens unit having a positive refractive power, a second lens unit having a negative refractive power, and a rear unit including at least one lens unit. The second lens unit is configured to move along an optical axis direction during zooming, and an interval between each pair of adjacent lens units is changed during zooming.

Figure 1:
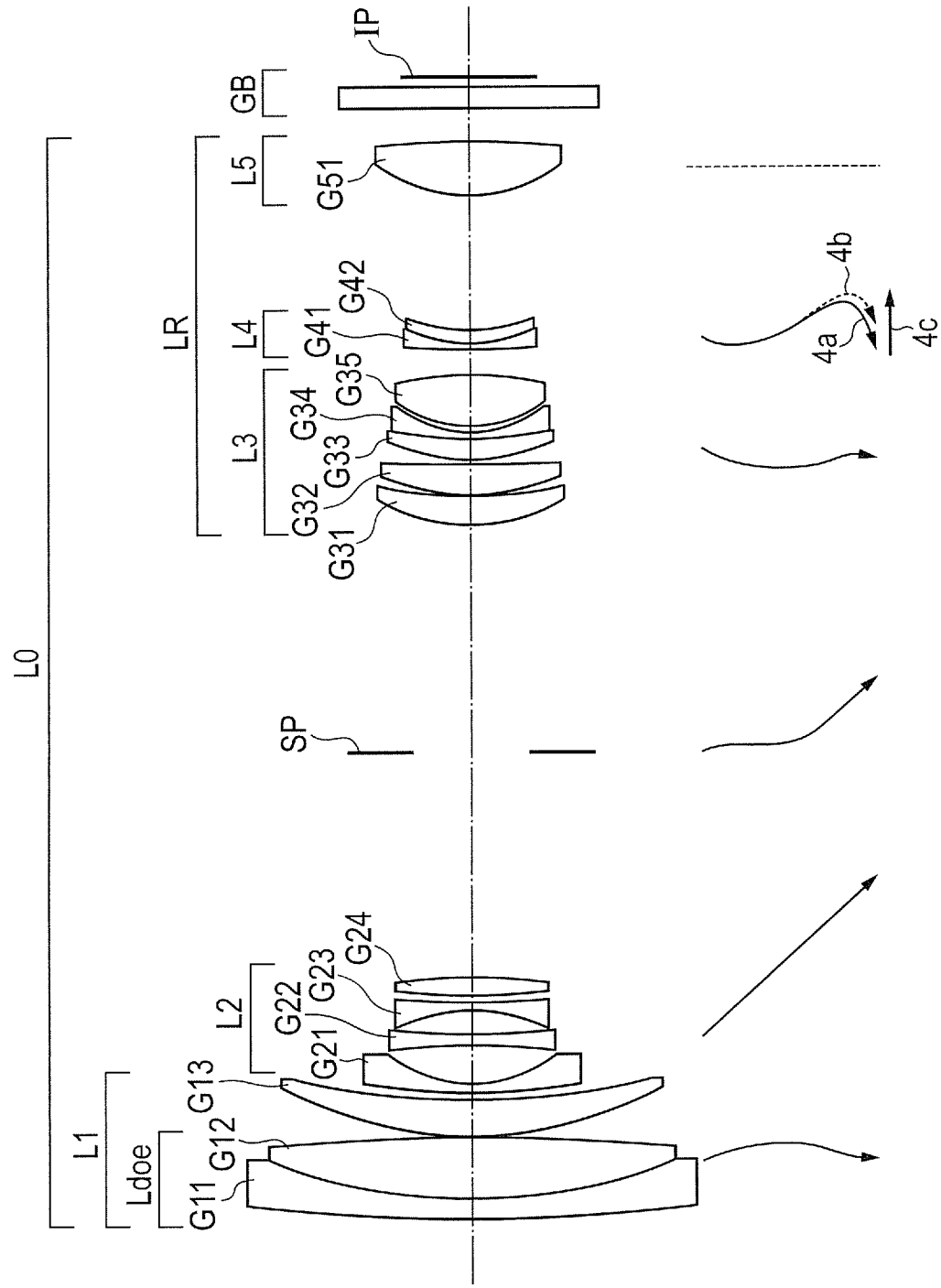
FIG. 1 is a lens cross-sectional view of a zoom lens of Example 1 of the present invention at a wide angle end when focused at infinity.
Figure 2:
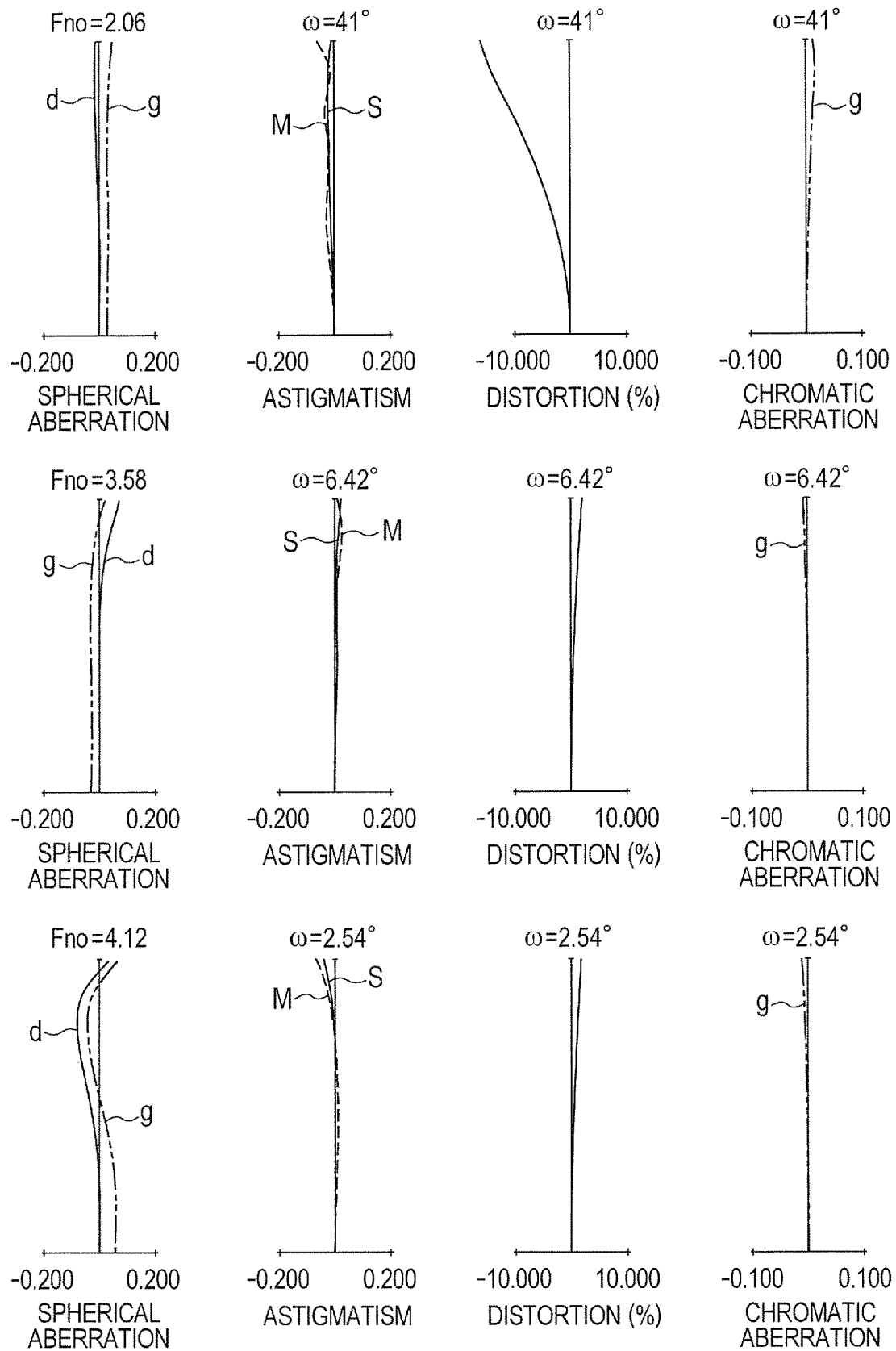
FIG. 2 is aberration diagrams of the zoom lens of Example 1 at the wide angle end, at an intermediate zoom position, and at a telephoto end when focused at infinity.

FIG. 1 is a lens cross-sectional view of a zoom lens of Example 1 of the present invention at a wide angle end (short focal length end) when the focus is on an object at infinity. FIG. 2 is longitudinal aberration diagrams of the zoom lens of Example 1 at the wide angle end, at an intermediate zoom position, and at a telephoto end (long focal length end) in order from the top when the focus is on an object at infinity. Example 1 represents a zoom lens having a zoom ratio of 19.09 and an F-number of from 2.06 to 4.12.

Figure 3:
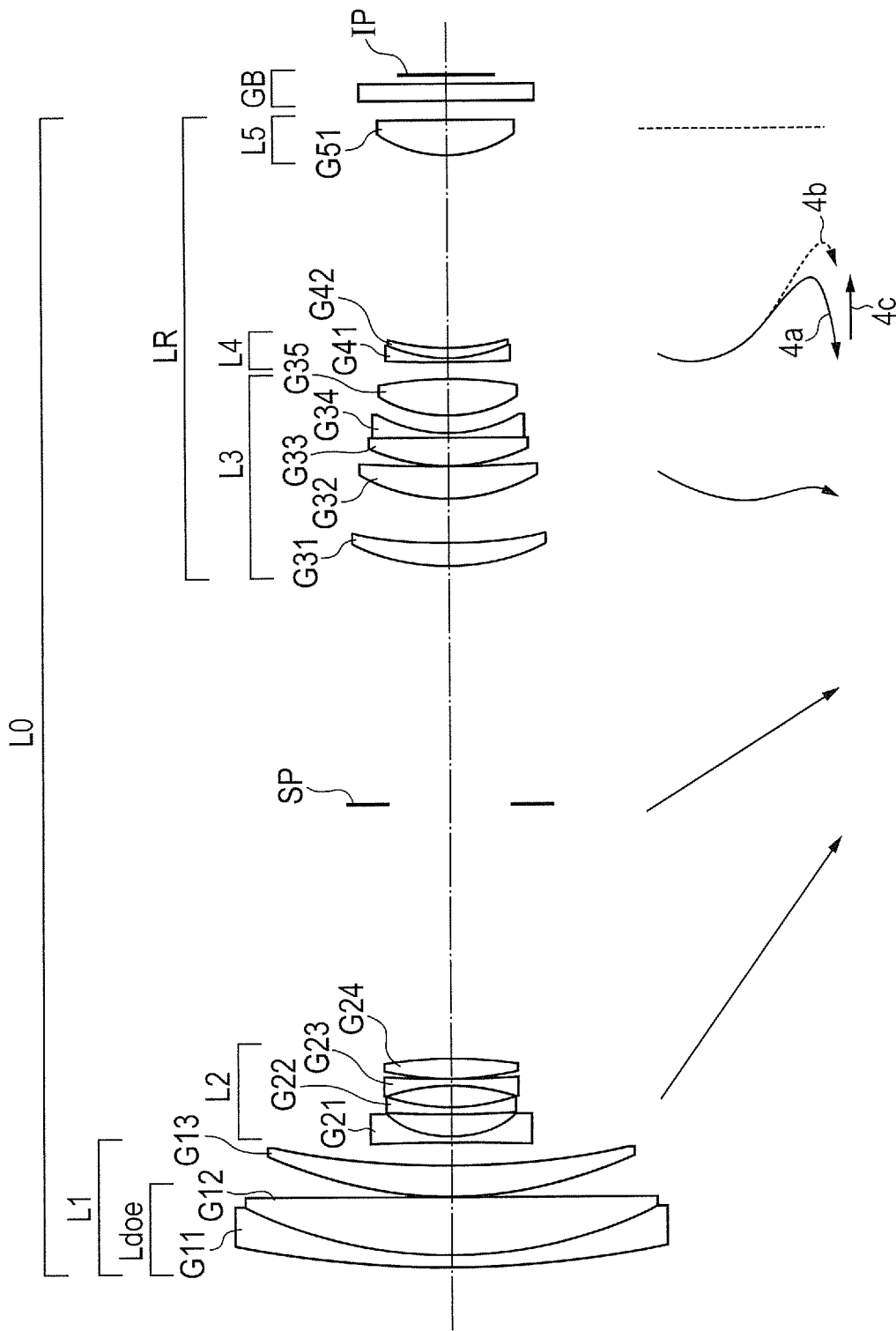
FIG. 3 is a lens cross-sectional view of a zoom lens of Example 2 of the present invention at a wide angle end when focused at infinity.
Figure 4:
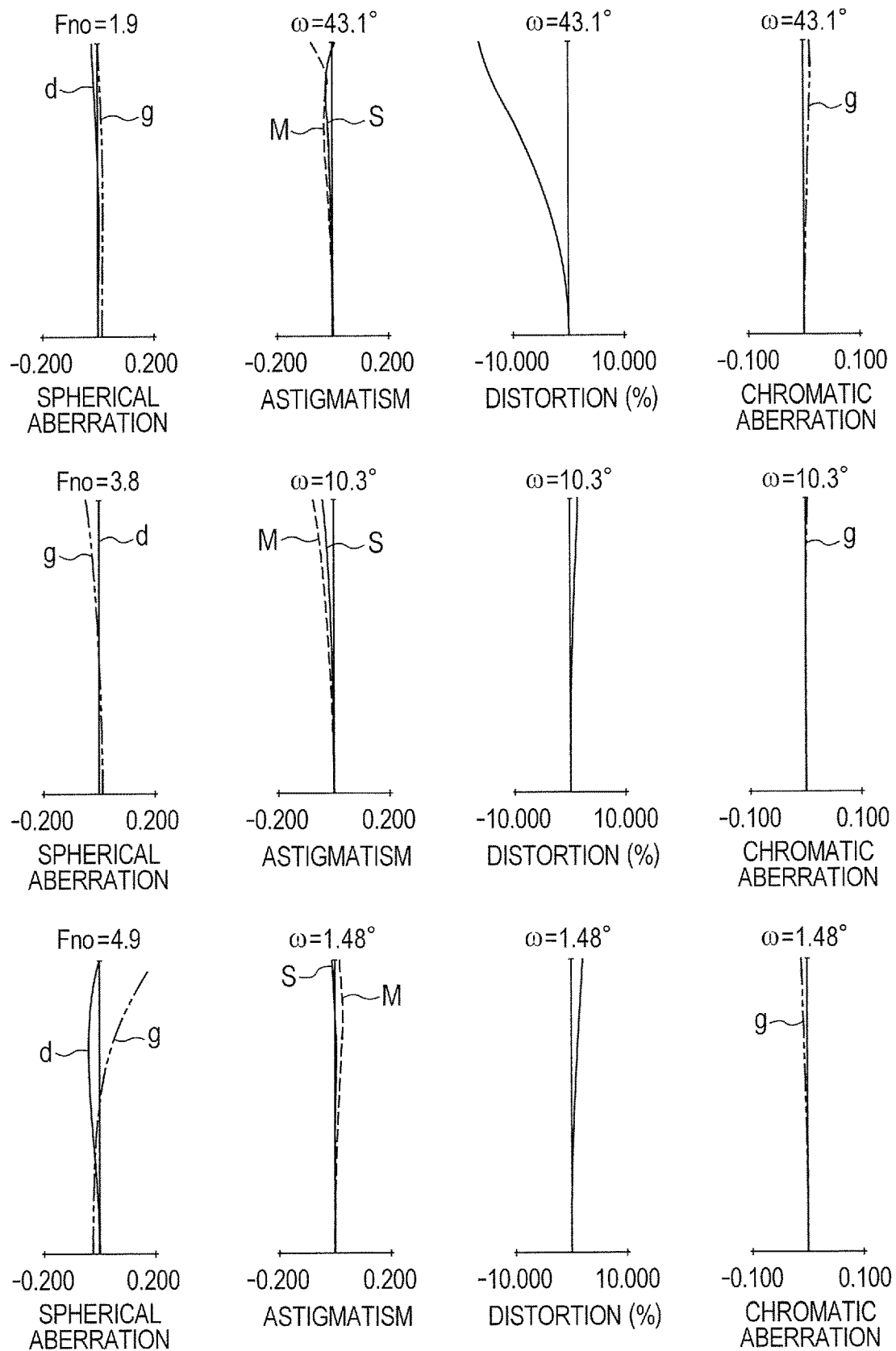
FIG. 4 is aberration diagrams of the zoom lens of Example 2 at the wide angle end, at an intermediate zoom position, and at a telephoto end when focused at infinity.

FIG. 3 is a lens cross-sectional view of a zoom lens of Example 2 of the present invention at a wide angle end when the focus is on an object at infinity. FIG. 4 is longitudinal aberration diagrams of the zoom lens of Example 2 at the wide angle end, at an intermediate zoom position, and at a telephoto end in order from the top when the focus is on an object at infinity. Example 2 represents a zoom lens having a zoom ratio of 30.0 and an F-number of from 1.90 to 4.90.

Figure 5:
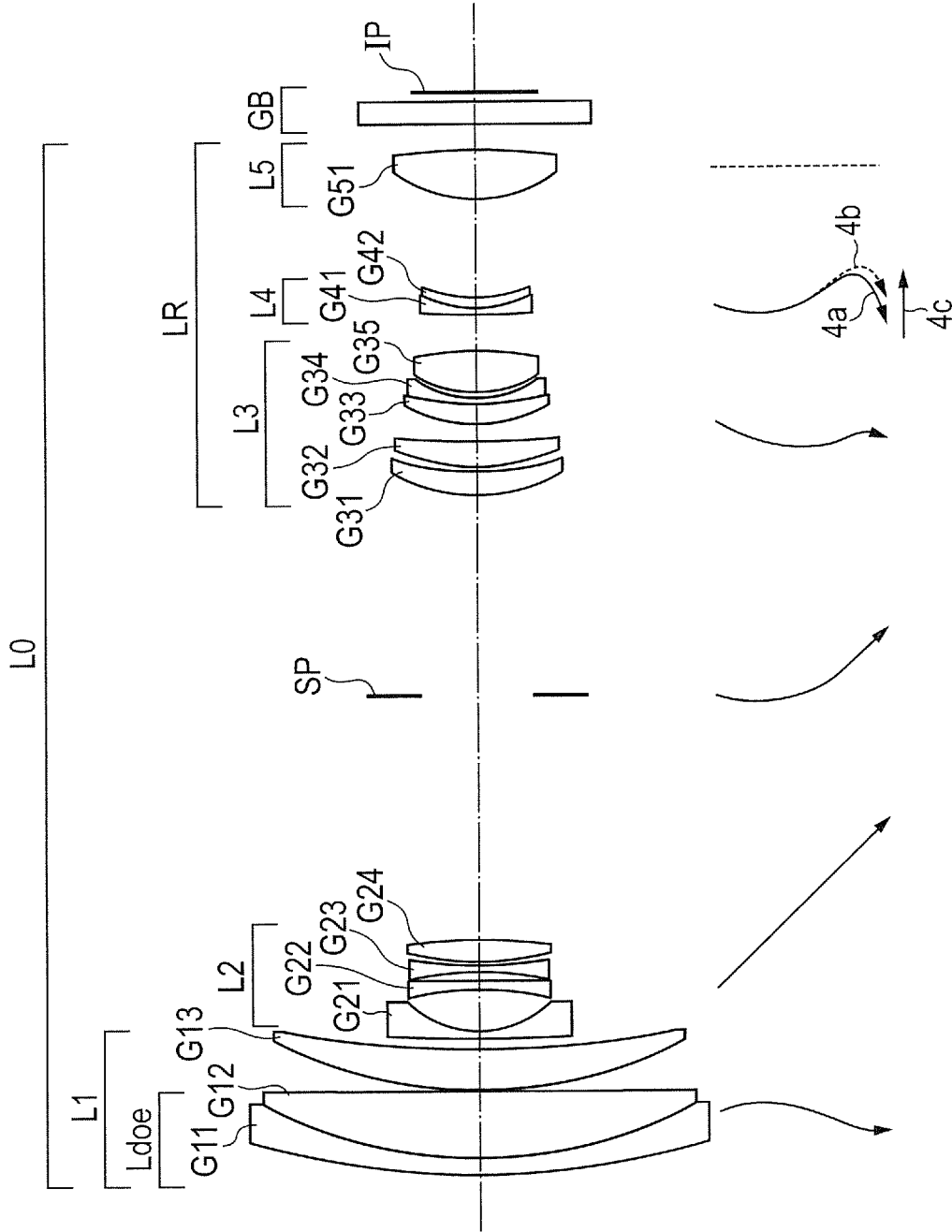
FIG. 5 is a lens cross-sectional view of a zoom lens of Example 3 of the present invention at a wide angle end when focused at infinity.
Figure 6:
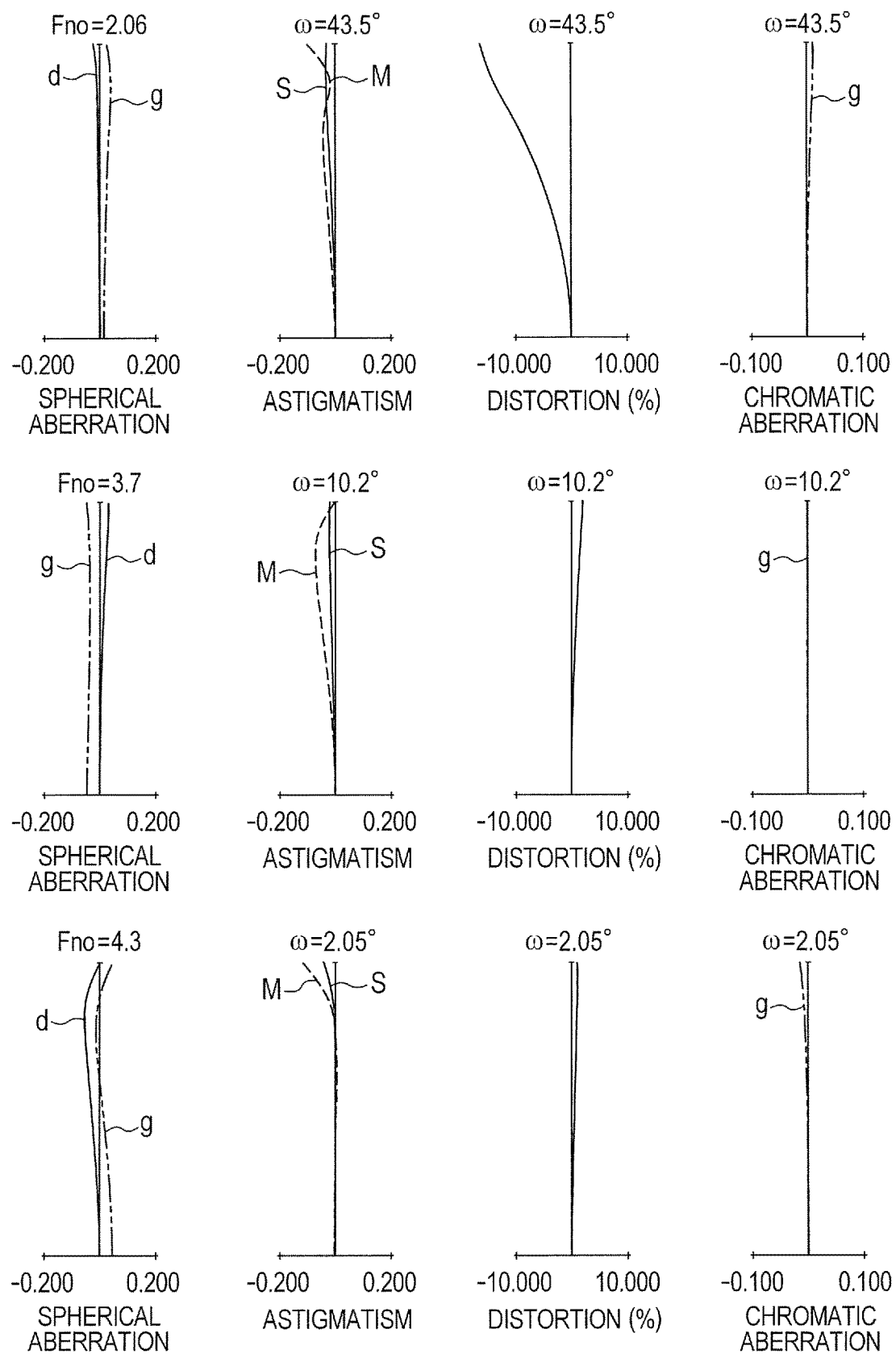
FIG. 6 is aberration diagrams of the zoom lens of Example 3 at the wide angle end, at an intermediate zoom position, and at a telephoto end when focused at infinity.

FIG. 5 is a lens cross-sectional view of a zoom lens of Example 3 of the present invention at a wide angle end when the focus is on an object at infinity. FIG. 6 is longitudinal aberration diagrams of the zoom lens of Example 3 at the wide angle end, at an intermediate zoom position, and at a telephoto end in order from the top when the focus is on an object at infinity. Example 3 represents a zoom lens having a zoom ratio of 26.00 and an F-number of from 2.06 to 4.30.

Figure 7:
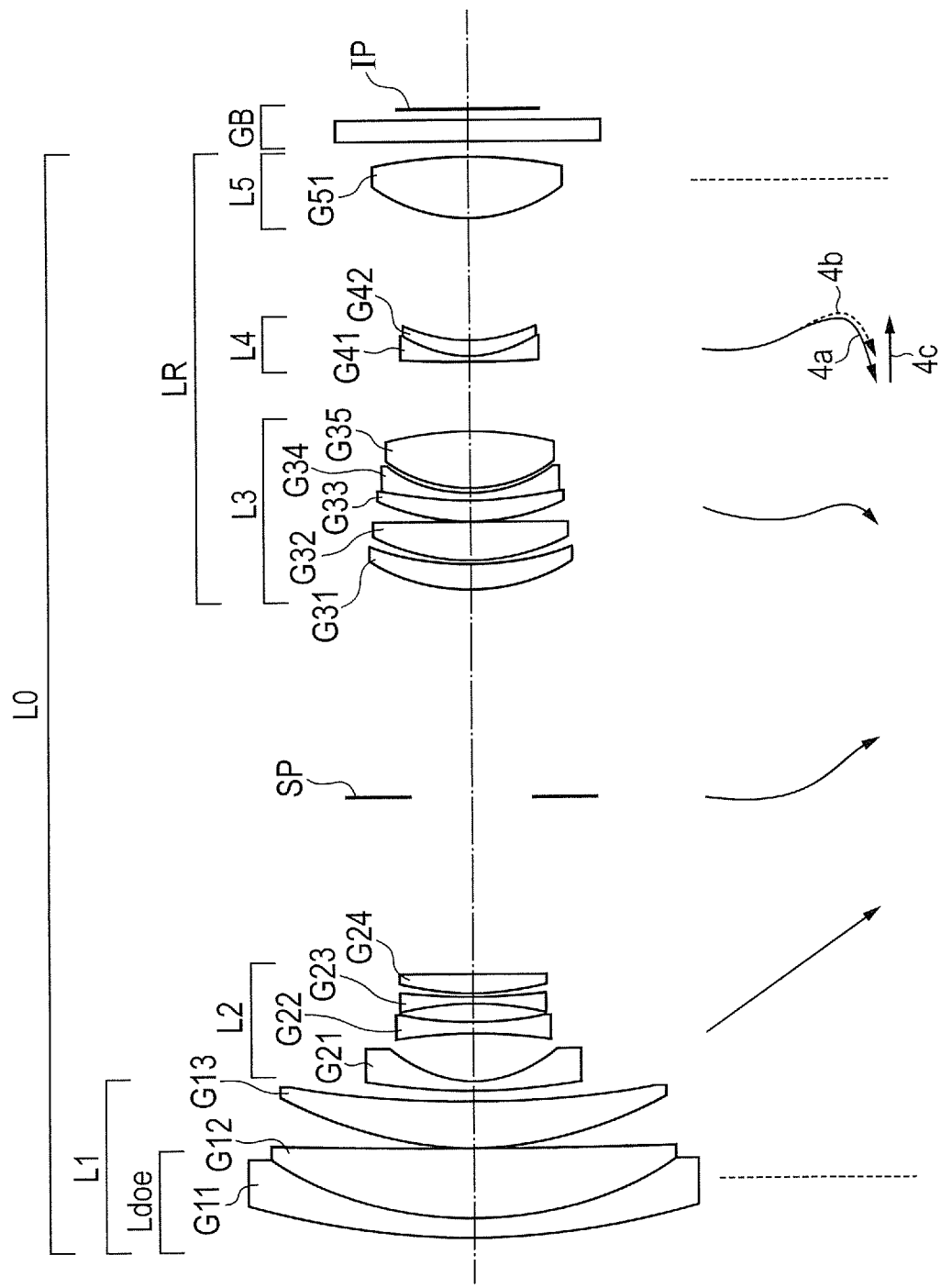
FIG. 7 is a lens cross-sectional view of a zoom lens of Example 4 of the present invention at a wide angle end when focused at infinity.
Figure 8:
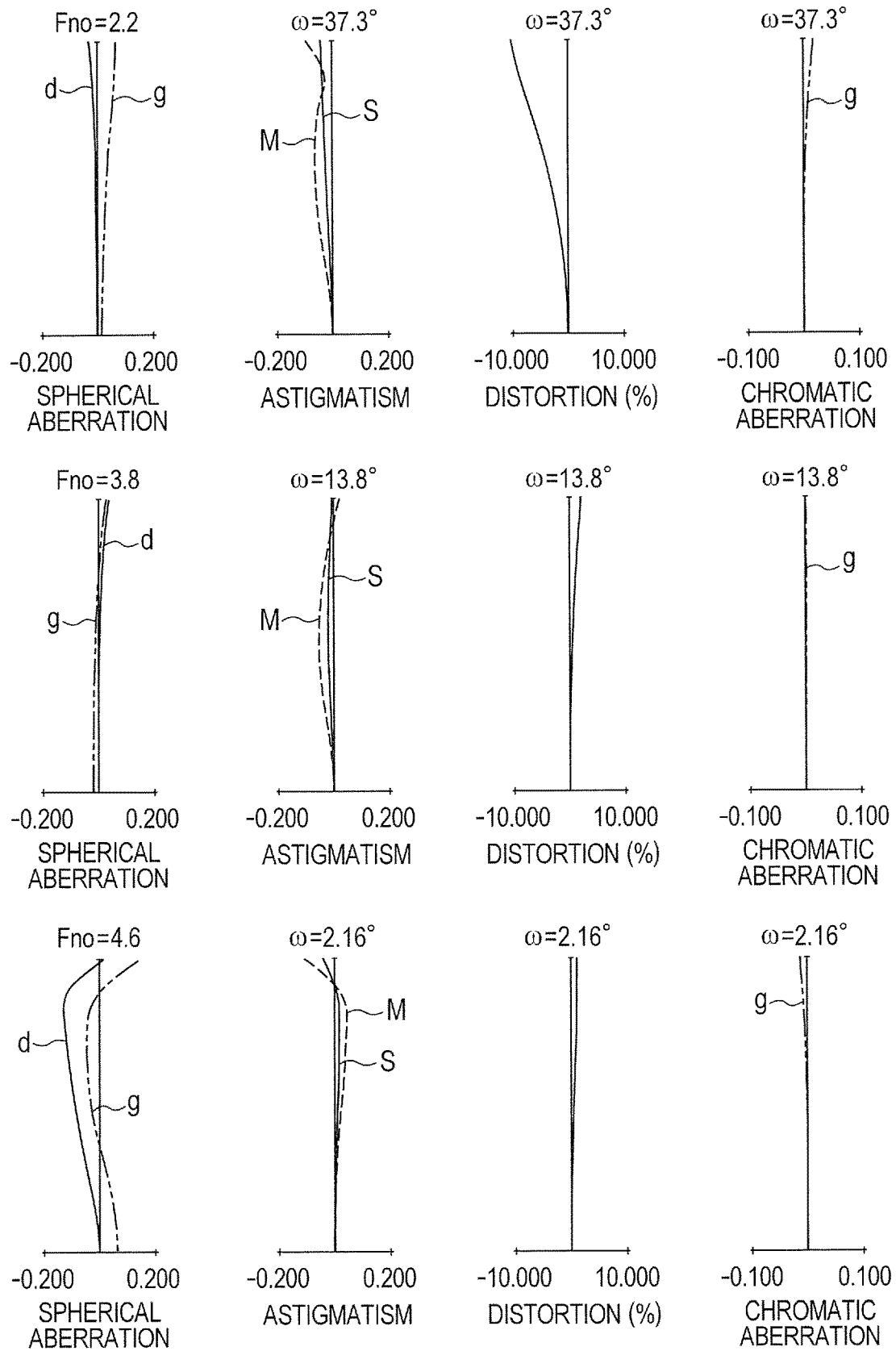
FIG. 8 is aberration diagrams of the zoom lens of Example 4 at the wide angle end, at an intermediate zoom position, and at a telephoto end when focused at infinity.

FIG. 7 is a lens cross-sectional view of a zoom lens of Example 4 of the present invention at a wide angle end when the focus is on an object at infinity. FIG. 8 is longitudinal aberration diagrams of the zoom lens of Example 4 at the wide angle end, at an intermediate zoom position, and at a telephoto end in order from the top when the focus is on an object at infinity. Example 4 represents a zoom lens having a zoom ratio of 18.01 and an F-number of from 2.20 to 4.60.

Figure 9:
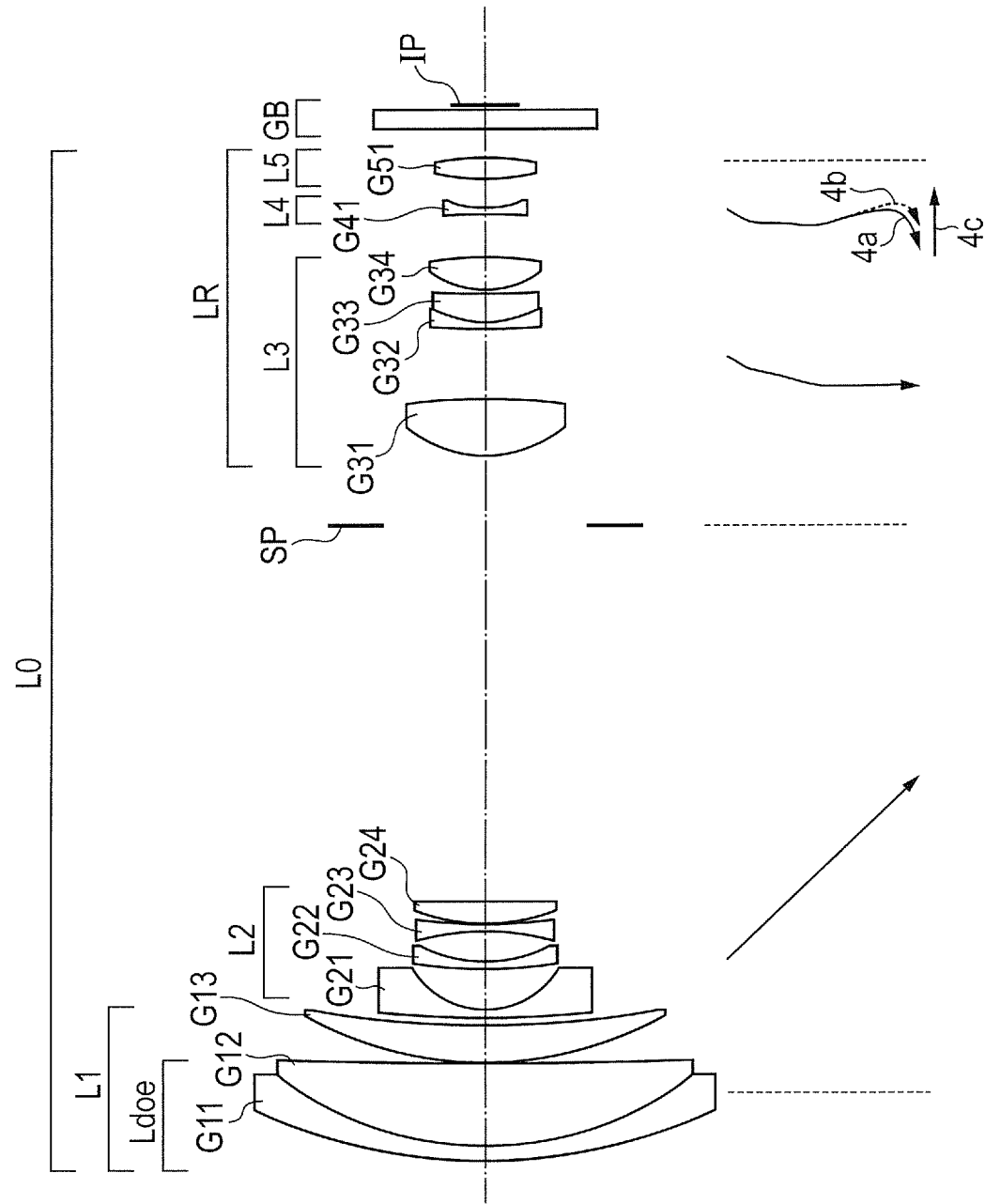
FIG. 9 is a lens cross-sectional view of a zoom lens of Example 5 of the present invention at a wide angle end when focused at infinity.
Figure 10:
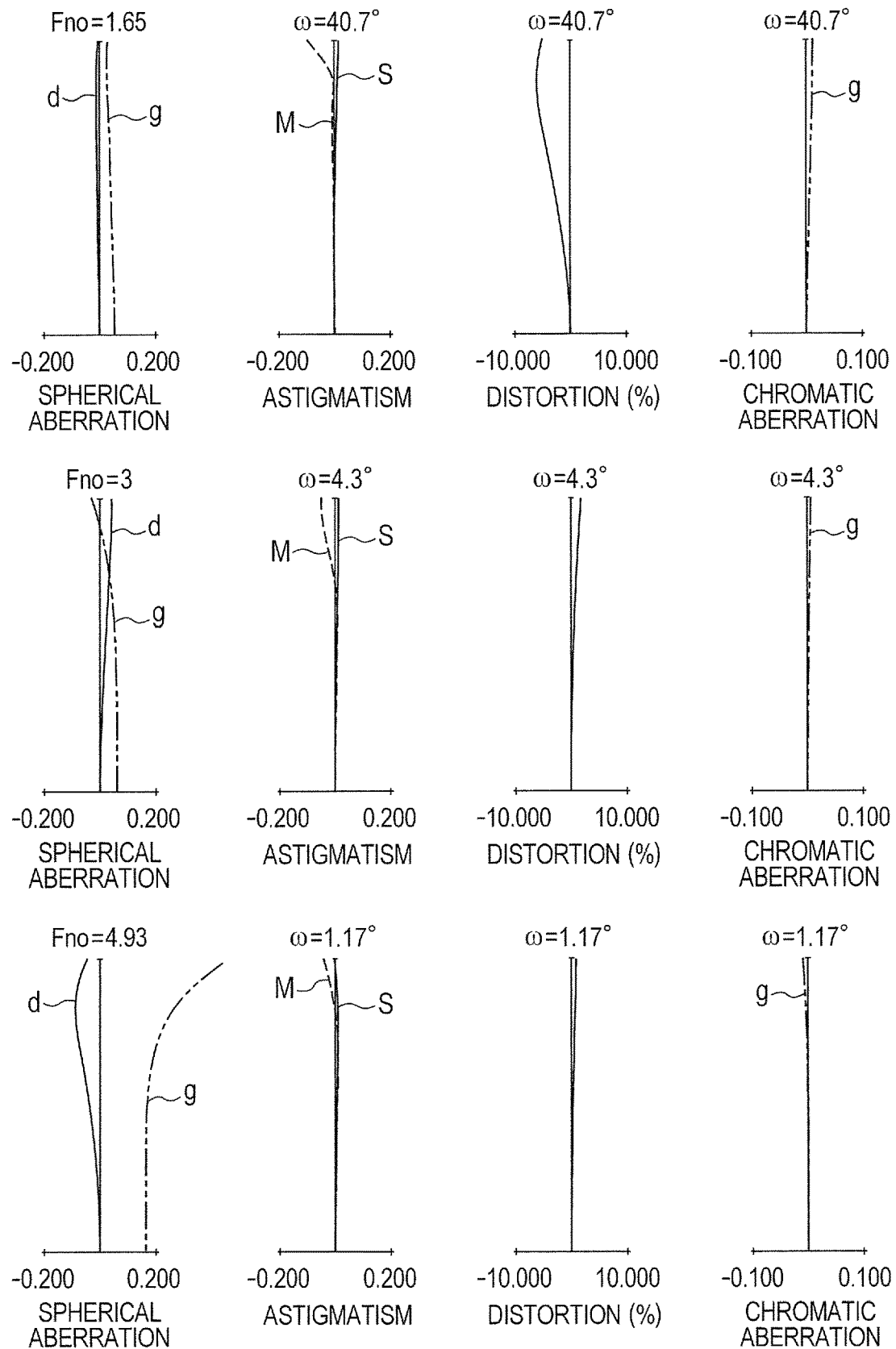
FIG. 10 is aberration diagrams of the zoom lens of Example 5 at the wide angle end, at an intermediate zoom position, and at a telephoto end when focused at infinity.

FIG. 9 is a lens cross-sectional view of a zoom lens of Example 5 of the present invention at a wide angle end when the focus is on an object at infinity. FIG. 10 is longitudinal aberration diagrams of the zoom lens of Example 5 at the wide angle end, at an intermediate zoom position, and at a telephoto end in order from the top when the focus is on an object at infinity. Example 5 represents a zoom lens having a zoom ratio of 39.58 and an F-number of from 1.65 to 4.93.

Figure 11:
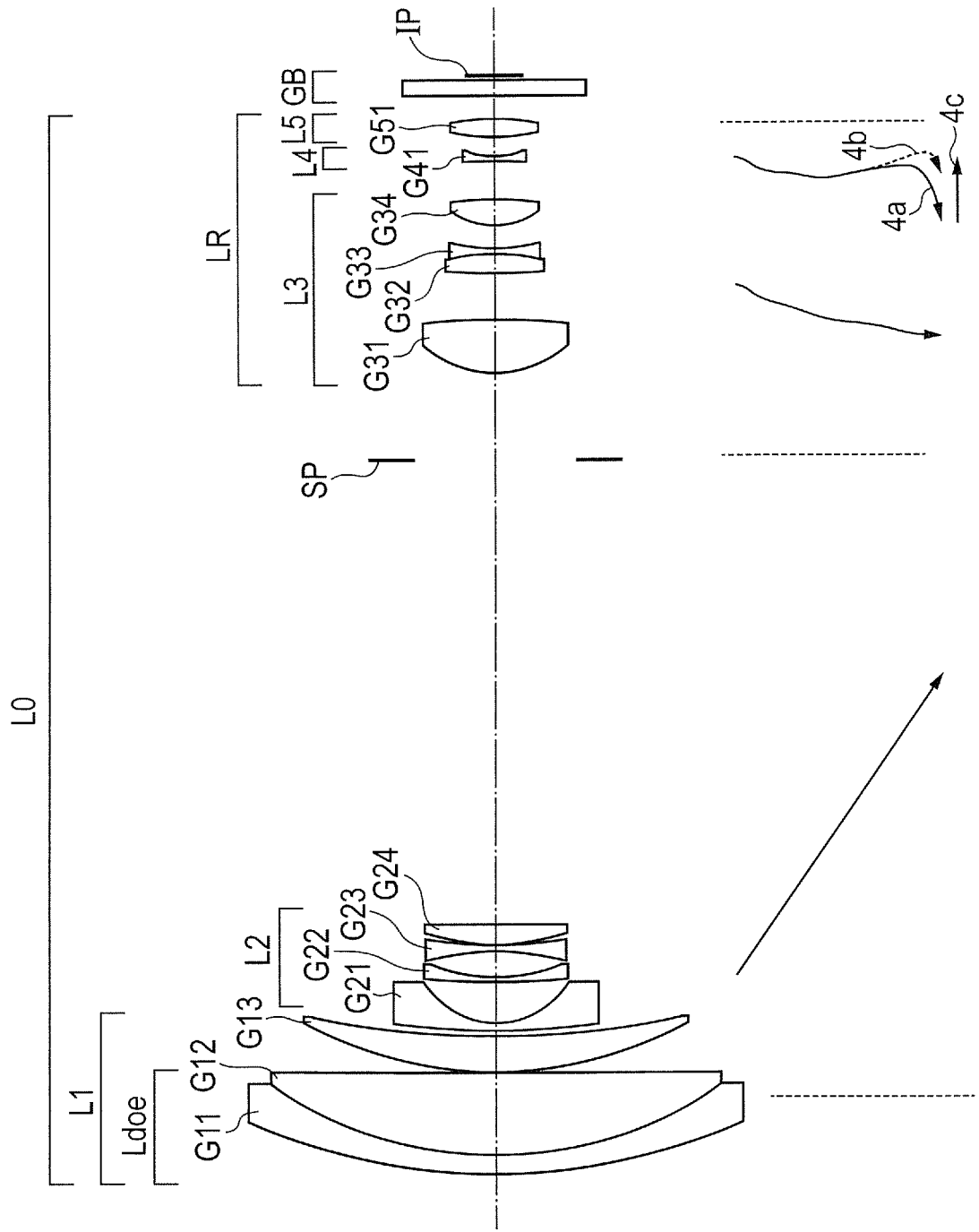
FIG. 11 is a lens cross-sectional view of a zoom lens of Example 6 of the present invention at a wide angle end when focused at infinity.
Figure 12:
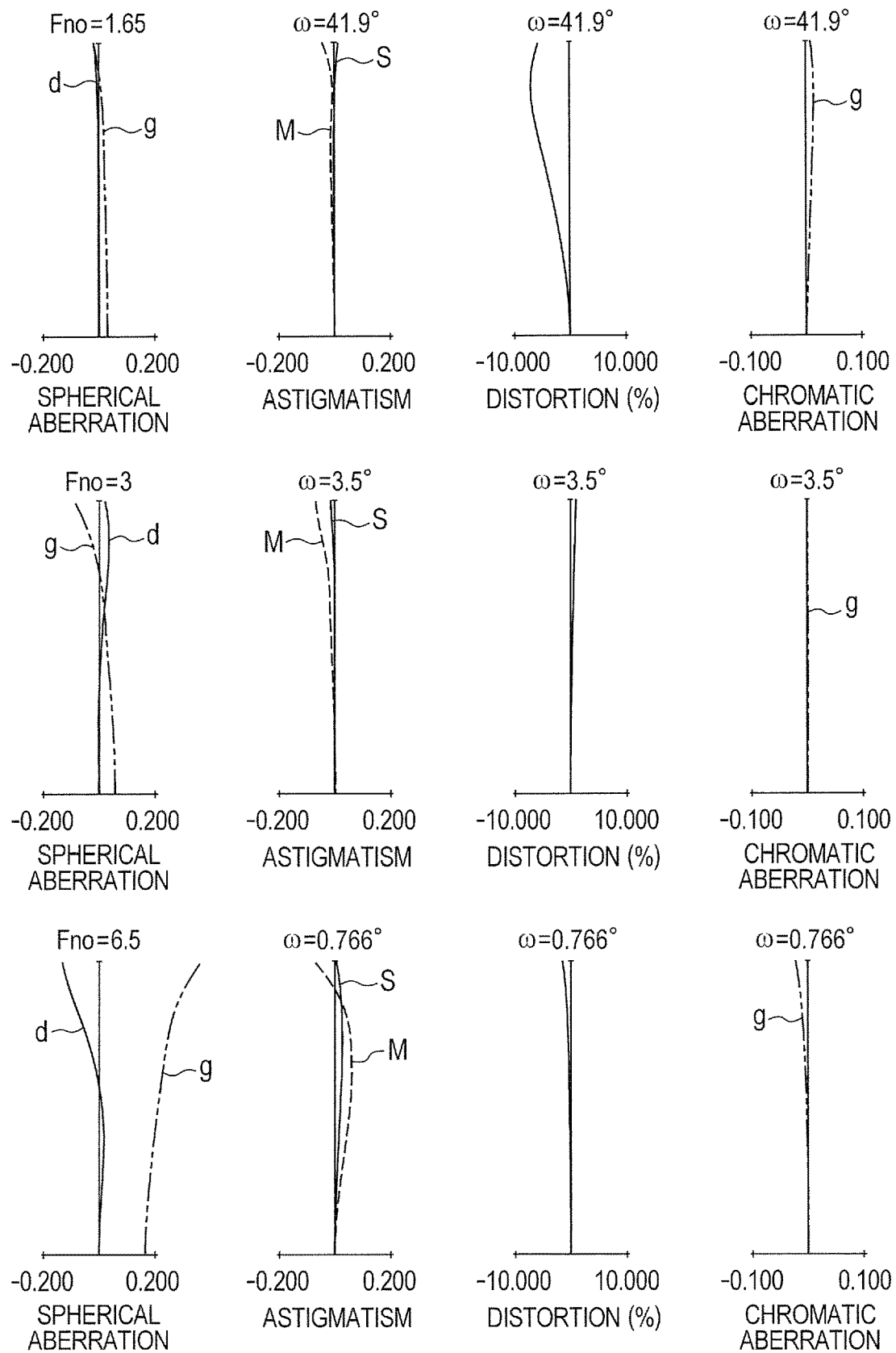
FIG. 12 is aberration diagrams of the zoom lens of Example 6 at the wide angle end, at an intermediate zoom position, and at a telephoto end when focused at infinity.

FIG. 11 is a lens cross-sectional view of a zoom lens of Example 6 of the present invention at a wide angle end when the focus is on an object at infinity. FIG. 12 is longitudinal aberration diagrams of the zoom lens of Example 6 at the wide angle end, at an intermediate zoom position, and at a telephoto end in order from the top when the focus is on an object at infinity. Example 6 represents a zoom lens having a zoom ratio of 64.27 and an F-number of from 1.65 to 6.50.

Figure 13:
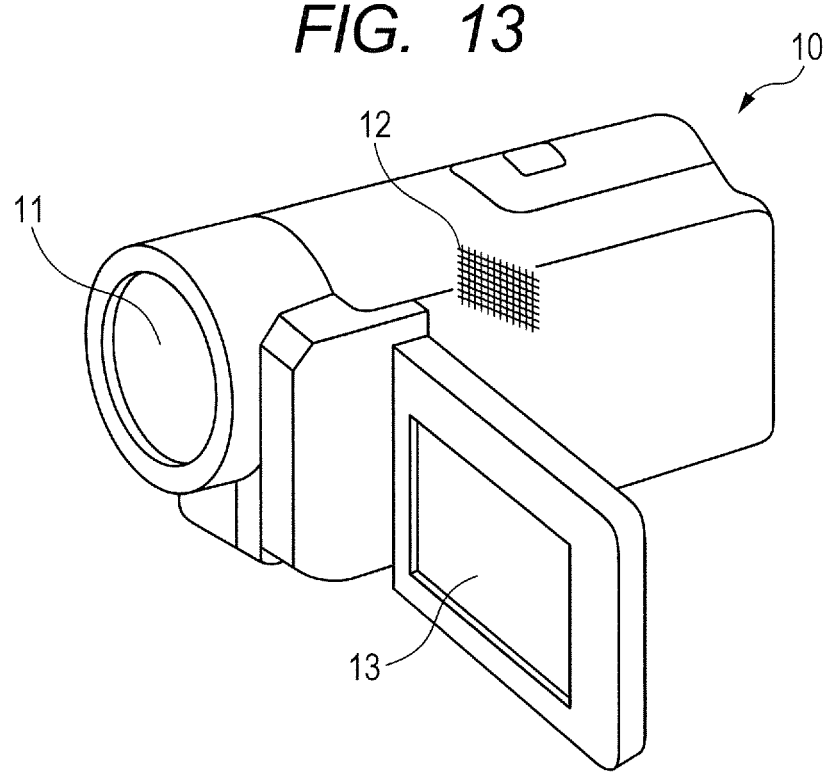
FIG. 13 is a schematic view of a main part of an image pickup apparatus according to an embodiment of the present invention.
Figure 14:
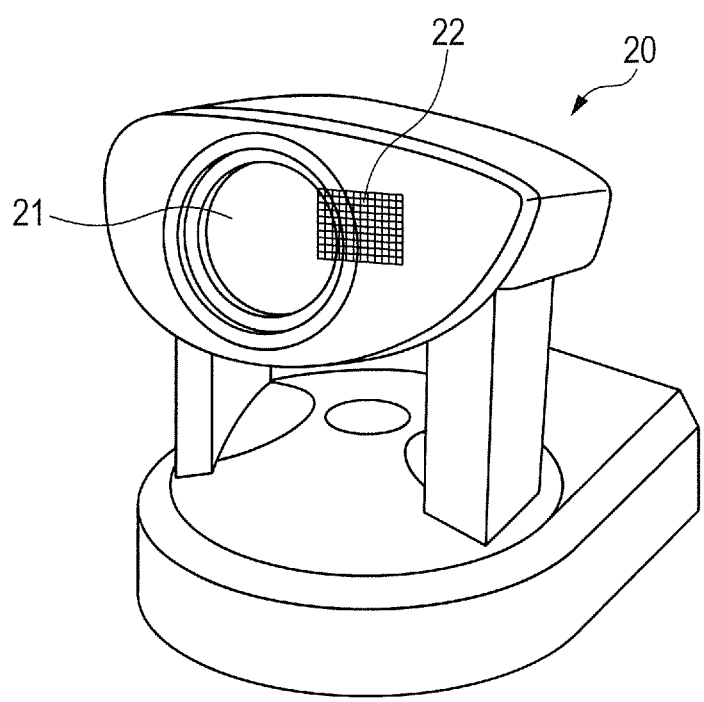
FIG. 14 is a schematic view of a main part of an image pickup apparatus according to another embodiment of the present invention.

FIG. 13 and FIG. 14 are each a schematic view of a main part of an image pickup apparatus according to an embodiment of the present invention.

The zoom lens of this embodiment is a zoom lens to be used in image pickup apparatus such as a digital camera, a video camera, a broadcasting camera, a monitoring camera, and a silver-halide film camera. The zoom lens of this embodiment may also be used as a projection optical system for a projection apparatus (projector).

In the lens cross-sectional views, the left side is the object side (front), and the right side is the image side (rear). A zoom lens L0 is illustrated in each of the lens cross-sectional views. When the order of a lens unit from the object side is represented by "i", the i-th lens unit is represented by Li. A rear unit LR includes at least one lens unit. The zoom lens further includes an aperture stop SP. An optical block GB corresponds to, for example, an optical filter, a face plate, a low pass filter, or an infrared cut filter.

An image plane IP corresponds to an image pickup surface of a solid-state image pickup element (photoelectric conversion element) such as a CCD sensor or a CMOS sensor when the zoom lens is used as an image pickup apparatus of a digital camera, a video camera, or the like. When the zoom lens is used as an image pickup apparatus of a silver-halide film camera, the image plane IP corresponds to a film surface. The movement locus of each lens unit during zooming from the wide angle end to the telephoto end is indicated by the arrow.

In each of Examples, a fourth lens unit L4 is configured to move to correct an image plane variation caused by magnification and to perform focusing. A solid-line curve 4a and a dotted-line curve 4b, which are related to the fourth lens unit L4, are movement loci for correcting the image plane variation caused by magnification when focused on an object at infinity and a close distance object, respectively. Further, during focusing from the object at infinity to the close distance object, the fourth lens unit L4 is moved toward the image side as indicated by an arrow 4c. Focusing may be performed not only with the fourth lens unit L4, but with one or a plurality of other lens units.

In the aberration diagrams, symbol Fno represents an F-number. Symbol "ω" represents a half angle of view (degrees). Further, in the spherical aberration diagrams, a solid line "d" indicates a d-line (wavelength of 587.6 nm), and a long dashed double-short dashed line "g" indicates a g-line (wavelength of 435.8 nm). In the astigmatism diagrams, a dotted line M indicates a meridional image plane in the d-line, and a solid line S indicates a sagittal image plane in the d-line. The distortion diagram is represented for the d-line. In the lateral chromatic aberration diagram, a long dashed double-short dashed line "g" indicates the g-line. When Numerical Data given later is expressed in units of millimeters, in the longitudinal aberration diagrams, the spherical aberration is drawn in the scale of 0.2 mm, the astigmatism is drawn in the scale of 0.2 mm, the distortion is drawn in the scale of 10%, and the lateral chromatic aberration is drawn in the scale of 0.1 mm.

The zoom lens of each of Examples includes, in order from an object side to an image side, a first lens unit L1 having a positive refractive power, a second lens unit L2 having a negative refractive power, and the rear unit LR including at least one lens unit. The rear unit LR has a positive refractive power over the entire zoom range. The first lens unit L1 includes a diffractive optical element Ldoe. The diffractive optical element Ldoe is cemented between an optical element A and an optical element B. The second lens unit L2 is configured to move along the optical axis direction during zooming. A focal length of the first lens unit L1 is represented by f1, an amount of movement of the second lens unit L2 during zooming from the wide angle end to the telephoto end is represented by m2, and a back focus at the wide angle end is represented by BFw.

At this time, the zoom lens of each of Examples satisfies the following conditional expressions:

$$1.00 < f1/m2 < 1.75 \quad (1); \text{ and}$$

$$0.05 < BFw/f1 < 0.15 \quad (2).$$

A back focus BF is an air-equivalent value from a last lens surface to an image plane. In this case, an amount of movement of a lens unit during zooming from the wide angle end to the telephoto end corresponds to a difference in position on the optical axis of the lens unit at the wide angle end and at the telephoto end. The sign of the amount of movement of the lens unit is positive when the lens unit is positioned on the image side at the telephoto end as compared to the wide angle end, and is negative when the lens unit is positioned on the object side at the telephoto end as compared to the wide angle end.

A diffraction surface of the diffractive optical element Ldoe in the first lens unit L1 is cemented in a form of being sandwiched between the optical element A and the optical element B. The diffraction surface of the diffractive optical element Ldoe is generally formed with use of UV-curable resin. When the diffractive optical element Ldoe is used under a state in which the diffraction surface is exposed to the outside, diffraction efficiency is reduced due to secular change, and thus the optical performance is deteriorated. Specifically, the power and the shape of the diffraction surface change due to water absorption, and thus the diffraction efficiency is reduced. In view of this, the diffraction surface of the diffractive optical element Ldoe is sandwiched between two optical elements A and B so that reduction in diffraction efficiency due to water absorption is suppressed. Next, technical meanings of Conditional Expressions (1) and (2) are described.

Conditional Expression (1) defines a ratio of the focal length of the first lens unit L1 to the amount of movement of the second lens unit L2 during zooming. When the ratio falls below the lower limit value of Conditional Expression (1) and the focal length of the first lens unit L1 becomes too short, various aberrations are increased and the optical performance is reduced. Alternatively, when the amount of movement of the second lens unit L2 becomes too large, it becomes difficult to downsize the entire system of the zoom lens. On the other hand, when the ratio exceeds the upper limit value of Conditional Expression (1) and the focal length of the first lens unit L1 becomes too long, it becomes difficult to downsize the entire system of the zoom lens. Alternatively, when the amount of movement of the second lens unit L2 becomes too small, it becomes difficult to achieve a high zoom ratio.

Conditional Expression (2) defines a ratio of the back focus at the wide angle end to the focal length of the first lens unit L1. When the ratio falls below the lower limit value of Conditional Expression (2) and the focal length of the first lens unit L1 becomes too long, it becomes difficult to achieve a high zoom ratio while downsizing the entire system of the zoom lens. On the other hand, when the ratio exceeds the upper limit value of Conditional Expression (2) and the back focus becomes too long, it becomes difficult to downsize the entire system of the zoom lens. Alternatively, when the focal length of the first lens unit L1 becomes too short, various aberrations are increased and it becomes difficult to obtain high optical performance.

It is more preferred to set the numerical ranges of Conditional Expressions (1) and (2) as follows:

$$1.35 < f1/m2 < 1.65 \quad (1a); \text{ and}$$

$$0.05 < BFw/f1 < 0.13 \quad (2a).$$

In each of Examples, the zoom lens is configured as described above to easily obtain a zoom lens that has a high zoom ratio and a small size as a whole while the axial chromatic aberration and the lateral chromatic aberration are reduced over the entire zoom range to achieve high optical performance.

In each of Examples, it is further preferred to satisfy at least one of the following various conditional expressions. A focal length of the second lens unit L2 is represented by f2. A total lens length at the wide angle end is represented by TDw, and a total lens length at the telephoto end is represented by TDt. In this case, the total lens length corresponds to a value obtained by adding an air-equivalent value of the back focus BF to a distance from a lens surface closest to the object side to a last lens surface. A focal length of the diffraction surface of the diffractive optical element Ldoe is represented by "fdoe". The first lens unit L1 includes a plurality of positive lenses, and the minimum value among the refractive indices of materials of the plurality of positive lenses is represented by nd1p.

A focal length of the entire system of the zoom lens at the wide angle end is represented by "fw". A focal length of the entire system of the zoom lens at the telephoto end is represented by "ft". In an image pickup apparatus including the zoom lens of this embodiment and a solid-state image pickup element configured to receive light of an image formed by the zoom lens, the maximum image height, which is specified as half of a diagonal length of the solid-state image pickup element, is represented by Y. In this case, the focal length "fdoe" of the diffraction surface is represented as follows.

A phase shape ψ of a diffraction grating of the diffraction surface can be expressed by the following polynomial:

$$\psi(h,m) = \{2\pi/(m \times \lambda_0)\}(C1 \times h^2 + C2 \times h^4 + C3 \times h^6 + \ldots) \quad (1X),$$

where "h" represents a vertical height with respect to an optical axis, "m" represents a diffraction order of diffraction light, λ0 represents a design wavelength, and Ci represents a phase coefficient (i=1, 2, 3, . . . ).

At this time, a power $\varphi(\lambda, m)$ that is a reciprocal of the focal length of the diffraction surface with respect to a freely-selected wavelength $\lambda$ and a freely-selected diffraction order "m" can be represented as follows with use of the phase coefficient C1:

$$\varphi(\lambda,m)=-2\times C1\times m\times \lambda/\lambda 0 \quad (2X)$$

In Expression (2X), when the diffraction order "m" is set to, for example, 1, and a negative value is selected for the phase coefficient, the diffraction surface can have a positive power. At this time, as is apparent from Expression (2X), in a wavelength range of $\lambda>\lambda 0$, a positive power linearly increases with respect to the change in wavelength as the wavelength becomes longer. Conversely, in a wavelength range of $\lambda<\lambda 0$, a positive power linearly decreases with respect to the change in wavelength as the wavelength becomes shorter.

When the diffraction order "m" is set to 1 based on Expression (2X), the focal length "fdoe" of the diffraction surface can be expressed as follows:

$$fdoe=-1/(2\times C1)(\lambda/\lambda 0) \quad (3X)$$

At this time, it is preferred to satisfy at least one of the following conditional expressions:

$$-9.0<f1/f2<-3.0 \quad (3)$$

$$0.95<TDt/TDw<1.20 \quad (4)$$

$$20.0<fdoe/f1<500.0 \quad (5)$$

$$nd1p>1.55 \quad (6)$$

$$-3.0<f2/fw<-0.4 \quad (7)$$

$$0.1<f1/ft<1.5 \quad (8); \text{ and}$$

$$0.015<Y/TDt<0.100 \quad (9)$$

Next, technical meanings of the above-mentioned conditional expressions are described. Conditional Expression (3) defines a ratio of the focal length of the first lens unit L1 to the focal length of the second lens unit L2. When the ratio falls below the lower limit value of Conditional Expression (3), an absolute value of the negative focal length of the second lens unit L2 configured to move during zooming becomes too small. In this case, the variations in various aberrations during zooming are increased, and it becomes difficult to obtain high optical performance over the entire zoom region. On the other hand, when the ratio exceeds the upper limit value of Conditional Expression (3) and the focal length of the first lens unit L1 becomes too short, spherical aberration and coma are greatly caused by the first lens unit L1 on the telephoto side, and it becomes difficult to correct the variations in aberration during zooming.

Conditional Expression (4) defines a ratio of a distance (total lens length) on the optical axis from a lens surface closest to the object side to the image plane at the telephoto end to that at the wide angle end. When the ratio falls below the lower limit value of Conditional Expression (4), it becomes difficult to achieve a high zoom ratio. On the other hand, when the ratio exceeds the upper limit value of Conditional Expression (4), the total lens length at the telephoto end is increased, and it becomes difficult to downsize the entire system of the zoom lens.

Conditional Expression (5) defines a ratio of the focal length of the diffraction surface of the diffractive optical element Ldoe to the focal length of the first lens unit L1. When the ratio falls below the lower limit value of Conditional Expression (5) and the focal length of the diffraction surface of the diffractive optical element Ldoe becomes too short, the axial chromatic aberration is disadvantageously overcorrected at the telephoto end.

Further, when the ratio falls below the lower limit value of Conditional Expression (5) and the focal length of the first lens unit L1 becomes too long, the zoom lens is disadvantageously increased in size as a whole. On the other hand, when the ratio exceeds the upper limit value of Conditional Expression (5) and the focal length of the diffraction surface of the diffractive optical element Ldoe becomes too long, the axial chromatic aberration is disadvantageously corrected insufficiently at the telephoto end. Further, when the ratio exceeds the upper limit value of Conditional Expression (5) and the focal length of the first lens unit L1 becomes too short, large amounts of spherical aberration and coma are caused by the first lens unit L1 on the telephoto side, and it becomes difficult to correct the variations in those various aberrations during zooming.

Conditional Expression (6) defines a refractive index of a material of a positive lens having the lowest refractive index of the material among the positive lenses included in the first lens unit L1. When the value falls below the lower limit value of Conditional Expression (6), various aberrations such as spherical aberration are increased at the telephoto end, and it becomes difficult to obtain high optical performance.

Conditional Expression (7) defines a ratio of the focal length of the second lens unit L2 to the focal length of the entire system of the zoom lens at the wide angle end. When the ratio falls below the lower limit value of Conditional Expression (7) and the negative focal length of the second lens unit L2 becomes too long (absolute value becomes too large), the stroke of movement of the second lens unit L2 for magnification is increased, and the total lens length is increased. On the other hand, when the ratio exceeds the upper limit value of Conditional Expression (7) and the negative focal length of the second lens unit L2 becomes too short (absolute value becomes too small), variations in field curvature and lateral chromatic aberration are disadvantageously increased in the entire zoom range.

Conditional Expression (8) defines a ratio of the focal length of the first lens unit L1 to the focal length of the entire system of the zoom lens at the telephoto end. When the ratio exceeds the upper limit value of Conditional Expression (8) and the focal length of the first lens unit L1 becomes too long, the total lens length is disadvantageously increased. On the other hand, when the ratio falls below the lower limit value of Conditional Expression (8) and the focal length of the first lens unit L1 becomes too short, spherical aberration and coma are greatly caused by the first lens unit L1 on the telephoto side, and it becomes difficult to correct the variations in those various aberrations during zooming.

Conditional Expression (9) defines a ratio of the maximum image height to the total lens length at the telephoto end. When the ratio falls below the lower limit value of Conditional Expression (9), the total lens length is increased too much at the telephoto end, and it becomes difficult to downsize the entire system of the zoom lens. On the other hand, when the ratio exceeds the upper limit value of Conditional Expression (9) and the total lens length becomes too short, the focal length of each lens unit is decreased, and various aberrations are increased. Thus, it becomes difficult to obtain high optical performance.

It is further preferred to set the numerical ranges of Conditional Expressions (3) to (9) as follows.

$$-8.0<f1/f2<-5.4 \qquad (3a)$$

$$0.97<TDt/TDw<1.10 \qquad (4a)$$

$$40.0<fdoe/f1<150.0 \qquad (5a)$$

$$nd1p>1.59 \qquad (6a)$$

$$-2.4<f2/fw<-0.8 \qquad (7a)$$

$$0.25<f1/ft<0.40 \qquad (8a)$$

$$0.025<Y/TDt<0.065 \qquad (9a)$$

In each of Examples, the first lens unit L1 is preferred to include, in order from the object side to the image side, a cemented lens obtained by cementing a negative lens G11 and a positive lens G12, and a positive lens G13. In this case, the optical element A corresponds to the negative lens G11, and the optical element B corresponds to the positive lens G12.

That is, the diffraction surface of the diffractive optical element is cemented between the negative lens G11 and the positive lens G12. The rear unit LR is preferred to include, in order from the object side to the image side, a third lens unit L3 having a positive refractive power, the fourth lens unit L4, and a fifth lens unit L5. Further, the third lens unit L3 and the fourth lens unit L4 are preferred to move along the optical axis direction for magnification from the wide angle end to the telephoto end and for correction of the image plane position along with the magnification.

Next, a lens configuration of a zoom lens of each of Examples is described.

Example 1

A zoom lens of Example 1 includes, in order from the object side to the image side, the following lens units: the first lens unit L1 having a positive refractive power, which includes the diffractive optical element Ldoe; the second lens unit L2 having a negative refractive power; the third lens unit L3 having a positive refractive power; the fourth lens unit L4 having a negative refractive power; and the fifth lens unit L5 having a positive refractive power. The rear unit LR is formed of the third lens unit L3 to the fifth lens unit L5.

The first lens unit L1 is configured to move along a locus convex to the image side during zooming from the wide angle end to the telephoto end. The second lens unit L2 is configured to move toward the image side to mainly perform magnification. The third lens unit L3 is configured to move to perform magnification. The fourth lens unit L4 is configured to move to correct the image plane variation accompanying the magnification. The fifth lens unit L5 is configured not to move.

Further, the aperture stop SP is arranged between the second lens unit L2 and the third lens unit L3. The aperture stop SP is configured to move to a position on the image side at the telephoto end as compared to the wide angle end. With the movement of the aperture stop SP, the ray height in the first lens unit L1 is reduced at the wide angle end so that the lateral chromatic aberration at the wide angle end is satisfactorily corrected.

The first lens unit L1 includes, in order from the object side to the image side, the cemented lens obtained by cementing the negative lens G11 and the positive lens G12, and the positive lens G13. The cemented lens obtained by cementing the negative lens G11 and the positive lens G12 forms the diffractive optical element Ldoe. The diffraction surface is a laminated type diffraction surface.

The second lens unit L2 includes, in order from the object side to the image side, a negative lens G21, a negative lens G22, a negative lens G23, and a positive lens G24. Both surfaces of the negative lens G22 have an aspherical shape. When a lens whose both surfaces have an aspherical shape is used in the second lens unit L2, which is a main magnification lens unit, the variation in field curvature is suppressed in the entire zoom range.

The third lens unit L3 includes, in order from the object side to the image side, a positive lens G31, a positive lens G32, a cemented lens obtained by cementing a positive lens G33 and a negative lens G34, and a positive lens G35. Both surfaces of each of the positive lens G31 and the positive lens G35 have an aspherical shape. In this manner, spherical aberration and coma are satisfactorily corrected.

The fourth lens unit L4 consists of a cemented lens obtained by cementing a negative lens G41 and a positive lens G42, which are arranged in order from the object side to the image side. With the cemented lens, variations in axial chromatic aberration and lateral chromatic aberration during zooming are satisfactorily corrected. The fifth lens unit L5 consists of a positive lens G51.

Example 2

A zoom lens of Example 2 includes, in order from the object side to the image side, the following lens units: the first lens unit L1 having a positive refractive power, which includes the diffractive optical element Ldoe; the second lens unit L2 having a negative refractive power; the third lens unit L3 having a positive refractive power; the fourth lens unit L4 having a negative refractive power; and the fifth lens unit L5 having a positive refractive power. The rear unit LR is formed of the third lens unit L3 to the fifth lens unit L5.

The first lens unit L1 is configured not to move during zooming from the wide angle end to the telephoto end. The second lens unit L2 is configured to move toward the image side to mainly perform magnification. The third lens unit L3 is configured to move to perform magnification. The fourth lens unit L4 is configured to move to correct the image plane variation accompanying the magnification. The fifth lens unit L5 is configured not to move. Further, the aperture stop SP is arranged between the second lens unit L2 and the third lens unit L3. The aperture stop SP is configured to move to a position on the image side at the telephoto end as compared to the wide angle end. With the movement of the aperture stop SP, the ray height in the first lens unit L1 is reduced at the wide angle end so that the lateral chromatic aberration at the wide angle end is satisfactorily corrected.

The lens configuration of the first lens unit L1 is the same as that in Example 1. The second lens unit L2 includes, in order from the object side to the image side, a negative lens G21, a negative lens G22, a negative lens G23, and a positive lens G24. The third lens unit L3 includes, in order from the object side to the image side, a positive lens G31, a positive lens G32, a cemented lens obtained by cementing a positive lens G33 and a negative lens G34, and a positive lens G35. Both surfaces of the positive lens G35 have an aspherical shape. In this manner, spherical aberration and coma are satisfactorily corrected. The lens configuration of the fourth lens unit L4 is the same as that in Example 1. The lens configuration of the fifth lens unit L5 is the same as that in Example 1.

Example 3

A zoom lens of Example 3 includes, in order from the object side to the image side, the following lens units: the first lens unit L1 having a positive refractive power, which includes the diffractive optical element Ldoe; the second lens unit L2 having a negative refractive power; the third lens unit L3 having a positive refractive power; the fourth lens unit L4 having a negative refractive power; and the fifth lens unit L5 having a positive refractive power. The rear unit LR is formed of the third lens unit L3 to the fifth lens unit L5.

The first lens unit L1 is configured to move along a locus convex to the image side during zooming from the wide angle end to the telephoto end. The second lens unit L2 is configured to move toward the image side to mainly perform magnification. The third lens unit L3 is configured to move to perform magnification. The fourth lens unit L4 is configured to move to correct the image plane variation accompanying the magnification. The fifth lens unit L5 is configured not to move.

Further, the aperture stop SP is arranged between the second lens unit L2 and the third lens unit L3. The aperture stop SP is configured to move to a position on the image side at the telephoto end as compared to the wide angle end. With the movement of the aperture stop SP, the ray height in the first lens unit L1 is reduced at the wide angle end so that the lateral chromatic aberration at the wide angle end is satisfactorily corrected. The lens configurations of the first lens unit L1 to the fifth lens unit L5 are the same as those in Example 1.

Example 4

A zoom lens of Example 4 includes, in order from the object side to the image side, the following lens units: the first lens unit L1 having a positive refractive power, which includes the diffractive optical element Ldoe; the second lens unit L2 having a negative refractive power; the third lens unit L3 having a positive refractive power; the fourth lens unit L4 having a negative refractive power; and the fifth lens unit L5 having a positive refractive power. The rear unit LR is formed of the third lens unit L3 to the fifth lens unit L5.

The first lens unit L1 is configured not to move during zooming from the wide angle end to the telephoto end. The second lens unit L2 is configured to move toward the image side to mainly perform magnification. The third lens unit L3 is configured to move to perform magnification. The fourth lens unit L4 is configured to move to correct the image plane variation accompanying the magnification. The fifth lens unit L5 is configured not to move.

Further, the aperture stop SP is arranged between the second lens unit L2 and the third lens unit L3. The aperture stop SP is configured to move to a position on the image side at the telephoto end as compared to the wide angle end. With the movement of the aperture stop SP, the ray height in the first lens unit L1 is reduced at the wide angle end so that the lateral chromatic aberration at the wide angle end is satisfactorily corrected. The lens configurations of the first lens unit L1 to the fifth lens unit L5 are the same as those in Example 1.

Example 5

A zoom lens of Example 5 includes, in order from the object side to the image side, the following lens units: the first lens unit L1 having a positive refractive power, which includes the diffractive optical element Ldoe; the second lens unit L2 having a negative refractive power; the third lens unit L3 having a positive refractive power; the fourth lens unit L4 having a negative refractive power; and the fifth lens unit L5 having a positive refractive power. The rear unit LR is formed of the third lens unit L3 to the fifth lens unit L5.

The first lens unit L1 is configured not to move during zooming from the wide angle end to the telephoto end. The second lens unit L2 is configured to move toward the image side to mainly perform magnification. The third lens unit L3 is configured to move to perform magnification. The fourth lens unit L4 is configured to move to correct the image plane variation accompanying the magnification. The fifth lens unit L5 is configured not to move. Further, the aperture stop SP is arranged between the second lens unit L2 and the third lens unit L3. The aperture stop SP is configured not to move. The lens configuration of the first lens unit L1 is the same as that in Example 1.

The second lens unit L2 includes, in order from the object side to the image side, a negative lens G21, a negative lens G22, a negative lens G23, and a positive lens G24. The third lens unit L3 includes, in order from the object side to the image side, a positive lens G31, a cemented lens obtained by cementing a negative lens G32 and a positive lens G33, and a positive lens G34. Both surfaces of each of the positive lens G31 and the positive lens G34 have an aspherical shape. In this manner, spherical aberration and coma are satisfactorily corrected. The fourth lens unit L4 consists of a negative lens G41. The fifth lens unit L5 consists of a positive lens G51.

Example 6

A zoom lens of Example 6 includes, in order from the object side to the image side, the following lens units: the first lens unit L1 having a positive refractive power, which includes the diffractive optical element Ldoe; the second lens unit L2 having a negative refractive power; the third lens unit L3 having a positive refractive power; the fourth lens unit L4 having a negative refractive power; and the fifth lens unit L5 having a positive refractive power. The rear unit LR is formed of the third lens unit L3 to the fifth lens unit L5.

The first lens unit L1 is configured not to move during zooming from the wide angle end to the telephoto end. The second lens unit L2 is configured to move toward the image side to mainly perform magnification. The third lens unit L3 is configured to move to perform magnification. The fourth lens unit L4 is configured to move to correct the image plane variation accompanying the magnification. The fifth lens unit L5 is configured not to move. Further, the aperture stop SP is arranged between the second lens unit L2 and the third lens unit L3. The aperture stop SP is configured not to move.

The lens configuration of the first lens unit L1 is the same as that in Example 1. The second lens unit L2 includes, in order from the object side to the image side, a negative lens G21, a negative lens G22, a negative lens G23, and a positive lens G24. The third lens unit L3 includes, in order from the object side to the image side, a positive lens G31, a cemented lens obtained by cementing a positive lens G32 and a negative lens G33, and a positive lens G34. Both surfaces of each of the positive lens G31 and the positive lens G34 have an aspherical shape. In this manner, spherical aberration and coma are satisfactorily corrected. The fourth lens consists of a negative lens G41. The fifth lens unit L5 consists of a positive lens G51.

In each of Examples, the cemented lens except for the diffractive optical element Ldoe may be present as separated lenses having a small air interval therebetween. Further, an aperture diameter of the aperture stop SP in each of Examples may be variable or invariable during zooming. When the aperture diameter varies, lower ray coma flare caused by off-axial light flux, which greatly occur particularly at the telephoto end, can be satisfactorily cut, and thus further satisfactory optical performance can be easily obtained.

This variation is within the assumption of the modification and the change as a lens shape in the zoom lens of this embodiment, and the same holds true in all of Examples.

Next, an image pickup apparatus corresponding to a digital video camera using the zoom lens of this embodiment as the image pickup optical system according to an embodiment of the present invention is described with reference to FIG. 13. In FIG. 13, there are illustrated a camera main body 10, and an image pickup optical system 11 formed of the zoom lens of any one of Examples 1 to 6. A solid-state image pickup element (photoelectric conversion element) 12, which is a CCD sensor or a CMOS sensor, for example, is built into the camera main body, and is configured to receive light of an object image formed by the image pickup optical system 11. A display 13 displays the object image obtained by the solid-state image pickup element 12.

Next, an image pickup apparatus corresponding to a monitoring camera using the zoom lens of this embodiment as the image pickup optical system according to another embodiment of the present invention is described with reference to FIG. 14. In FIG. 14, there are illustrated a camera main body 20, and an image pickup optical system 21 formed of the zoom lens of any one of Examples 1 to 6. A solid-state image pickup element (photoelectric conversion element) 22, which is a CCD sensor or a CMOS sensor, for example, is built into the camera main body 20, and is configured to receive light of an object image formed by the image pickup optical system 21. When the zoom lens of this embodiment is applied to the image pickup apparatus, for example, a digital video camera or a monitoring camera as described above, a compact image pickup apparatus having high optical performance is achieved.

The zoom lens of each of Examples can be used as a projection optical system for a projection apparatus (projector).

The exemplary embodiment of the present invention is described above, but the present invention is not limited to the embodiment and can be modified and changed variously within the scope of the gist thereof.

The image pickup apparatus of this embodiment may include, in addition to any one of the above-mentioned zoom lenses, a circuit (corrector) configured to electrically correct at least one of distortion or lateral chromatic aberration. When a configuration that can allow the distortion or other aberrations of the zoom lens is employed as described above, the number of lenses of the entire system of the zoom lens can be reduced, and the zoom lens is easily downsized. Further, electrical correction of the lateral chromatic aberration reduces color bleeding of a taken image and facilitates the increase of the resolution.

Here, an image pickup system (a monitoring camera system) including the zoom lens of any one of the examples and a control unit to control the zoom lens may be constructed. In this case, the control unit may control the zoom lens so that each of the lens units is moved during zooming as described above. In this case, the control unit does not always have to be integrated with the zoom lens. Hence, the control unit may be provided separately from the zoom lens. For example, a control unit (a control apparatus) may be located remote from a drive unit to drive the respective lenses in the zoom lens, and configured to include a transmitter to transmit a control signal (a command) for controlling the zoom lens. The above-mentioned control unit can remote-control the zoom lens.

Meanwhile, a configuration to control the zoom lens in response to an input from a user to an operation unit may be adopted by providing the control unit with the operation unit such as a controller and buttons for remote-controlling the zoom lens. For example, a zoom-in button and a zoom-out button are provided as the operation unit so as to transmit the signals from the control unit to the drive unit for the zoom lens in such a way that the magnification of the zoom lens is increased when a user presses the zoom-in button and the magnification of the zoom lens is decreased when the user presses the zoom-out button.

In the meantime, the image pickup system may include a display unit such as a liquid crystal panel to display information related to zooming of the zoom lens (a state of movement). Examples of the information related to zooming of the zoom lens include a zoom magnification (a zoom state) and an amount of movement (a state of movement) of each lens unit. In this case, the user can remote-control the zoom lens through the operation unit while watching the information related to zooming of the zoom lens displayed on the display unit. In this case, the display unit and the operation unit may be integrated together by adopting a touch panel, for example.

Specific numerical data of Examples 1 to 6 are described below. In each numerical data, "i" indicates the order from the object side, "ri" indicates the curvature radius of an i-th optical surface (i-th surface), "di" indicates an on-axis interval between the i-th surface and an (i+1)-th surface, and "ndi" and "vdi" indicate the refractive index and Abbe number of a material of an optical member between the i-th surface and the (i+1)-th surface with respect to the d-line, respectively. An Abbe number "vddoe" related to the d-line and a partial dispersion ratio θCtdoe related to a C-line and a t-line of the diffraction surface are represented by the following expressions when wavelengths of the d-line, the C-line, the F-line, and the t-line are represented by λd, λC (wavelength of 656.27 nm), λF, and λt (wavelength of 1,013.98 nm), respectively:

$$vddoe=\lambda d/(\lambda F-\lambda C); \text{ and}$$

$$\theta Ctdoe=(\lambda C-\lambda t)/(\lambda F-\lambda C).$$

In this manner, the Abbe number "vddoe" and the partial dispersion ratio θCtdoe become −3.45 and 2.10, respectively. The Abbe number of the diffraction surface has a negative value, and thus the diffraction surface provides a reverse action from that of a general optical material. An aspherical shape is expressed by the following expression.

$$X = \frac{H^2/R}{1+\sqrt{1-(1+K)(H/R)^2}} + A4H^4 + A6H^6 + A8H^8 + A10H^{10}$$

In this expression, the X-axis represents an optical axis direction, the H-axis represents an axis in a direction perpendicular to the optical axis, a traveling direction of light is positive, R represents a paraxial curvature radius, K represents a conic constant, and A4, A6, A8, and A10 represent aspherical coefficients, respectively.

The asterisk (*) indicates a surface having an aspherical shape. The notation "e-x" indicates $10^{-x}$. BF indicates an air-equivalent back focus. The total lens length is a value obtained by adding the back focus BF to a distance from the first lens surface to the last lens surface. The focal length, the F-number, and the half angle of view are each a value obtained when the focus is on an object at infinity. Moreover, a relationship between the conditional expressions described above and Numerical Examples is shown in Table 1.

Numerical data 1
Unit: mm

Surface data

| Surface number | ri | di | ndi | vdi |
|---|---|---|---|---|
| 1 | 162.733 | 1.50 | 1.85478 | 24.8 |
| 2 (Diffraction) | 42.441 | 4.82 | 1.77250 | 49.6 |
| 3 | −176.784 | 0.15 | | |
| 4 | 31.030 | 2.73 | 1.80400 | 46.6 |
| 5 | 62.130 | (Variable) | | |
| 6 | 53.030 | 0.65 | 1.88300 | 40.8 |
| 7 | 10.663 | 3.04 | | |
| 8* | −39.841 | 0.80 | 1.77250 | 49.6 |
| 9* | 131.643 | 1.99 | | |
| 10 | −12.769 | 0.50 | 1.69680 | 55.5 |
| 11 | 58.578 | 0.49 | | |
| 12 | 44.559 | 1.55 | 1.95906 | 17.5 |
| 13 | −47.716 | (Variable) | | |
| 14 (Stop) | ∞ | (Variable) | | |
| 15* | 14.492 | 2.23 | 1.88202 | 37.2 |
| 16* | 35.170 | 0.17 | | |
| 17 | 17.497 | 2.32 | 1.48749 | 70.2 |
| 18 | 176.882 | 0.31 | | |
| 19 | 14.780 | 1.66 | 1.49700 | 81.5 |
| 20 | 30.162 | 0.50 | 2.00069 | 25.5 |
| 21 | 9.317 | 0.50 | | |
| 22* | 10.296 | 3.87 | 1.49700 | 81.5 |
| 23* | −24.797 | (Variable) | | |
| 24 | 69.016 | 0.45 | 1.88300 | 40.8 |
| 25 | 9.819 | 1.05 | 1.89286 | 20.4 |
| 26 | 12.189 | (Variable) | | |
| 27 | 12.093 | 4.28 | 1.49700 | 81.5 |
| 28 | −67.237 | 2.48 | | |
| 29 | ∞ | 1.70 | 1.51633 | 64.1 |
| 30 | ∞ | 2.09 | | |
| Image plane | ∞ | | | |

Aspherical surface data

Second surface (diffraction surface)

A2 = −1.63156e−004   A4 = 7.33797e−008   A6 = −1.13068e−010
A8 = −9.63136e−014   A10 = 9.97824e−016

Eighth surface

K = −4.47637e+000   A5 = 1.46851e−005   A7 = 7.39012e−008
A9 = −4.58297e−009

Ninth surface

K = −1.97936e+000   A4 = 5.13211e−005   A6 = 5.02218e−006
A8 = −6.95625e−008

Fifteenth surface

K = −2.55124e−002   A4 = 3.49920e−006
Sixteenth surface

K = −1.93738e+000   A4 = 4.32679e−005
Twenty-second surface

K = 8.18784e−001   A4 = −1.39872e−004   A6 = −4.46451e−007
A8 = −3.37644e−008

-continued

Numerical data 1
Unit: mm

Twenty-third surface

K = −3.48068e+001   A4 = −1.83963e−004   A6 = 8.18669e−006
A8 = −1.80381e−007   A10 = 2.33486e−009

Various data
Zoom ratio 19.09

| | Wide angle | Intermediate | Telephoto |
|---|---|---|---|
| Focal length | 6.40 | 47.97 | 122.14 |
| F-number | 2.06 | 3.58 | 4.12 |
| Half angle of view (degrees) | 41.00 | 6.42 | 2.54 |
| Image height | 4.67 | 5.50 | 5.50 |
| Total lens length | 89.99 | 89.09 | 89.99 |
| BF | 5.69 | 5.69 | 5.69 |
| d5 | 0.60 | 25.24 | 31.94 |
| d13 | 17.47 | 0.85 | 0.80 |
| d14 | 17.63 | 6.84 | 0.60 |
| d23 | 2.00 | 10.98 | 2.00 |
| d26 | 10.47 | 3.36 | 12.83 |

Zoom lens unit data

| Unit | First surface | Focal length |
|---|---|---|
| 1 | 1 | 46.77 |
| 2 | 6 | −8.10 |
| 3 | 15 | 14.44 |
| 4 | 24 | −17.04 |
| 5 | 27 | 21.00 |

Numerical data 2
Unit: mm

Surface data

| Surface number | ri | di | ndi | vdi |
|---|---|---|---|---|
| 1 | 123.509 | 1.50 | 1.85478 | 24.8 |
| 2 (Diffraction) | 53.554 | 6.69 | 1.77250 | 49.6 |
| 3 | −13,941.303 | 0.15 | | |
| 4 | 50.190 | 3.50 | 1.77250 | 49.6 |
| 5 | 112.028 | (Variable) | | |
| 6 | −209.460 | 0.65 | 2.00100 | 29.1 |
| 7 | 12.300 | 2.75 | | |
| 8 | 225.243 | 0.80 | 2.00100 | 29.1 |
| 9 | 27.073 | 2.73 | | |
| 10 | −19.607 | 0.50 | 1.59522 | 67.7 |
| 11 | 109.604 | 0.10 | | |
| 12 | 36.882 | 2.48 | 1.95906 | 17.5 |
| 13 | −42.738 | (Variable) | | |
| 14 (Stop) | ∞ | (Variable) | | |
| 15 | 25.788 | 2.72 | 1.91082 | 35.3 |
| 16 | 55.574 | 5.00 | | |
| 17 | 19.146 | 3.75 | 1.48749 | 70.2 |
| 18 | 110.997 | 0.15 | | |
| 19 | 20.626 | 3.31 | 1.49700 | 81.5 |
| 20 | −4,103.359 | 0.50 | 2.00100 | 29.1 |
| 21 | 16.182 | 2.08 | | |
| 22* | 14.933 | 4.21 | 1.49700 | 81.5 |
| 23* | −38.933 | (Variable) | | |
| 24 | 197.279 | 0.50 | 1.91082 | 35.3 |
| 25 | 17.950 | 1.09 | 1.95906 | 17.5 |
| 26 | 23.759 | (Variable) | | |

Numerical data 2
Unit: mm

| | | | | |
|---|---|---|---|---|
| 27 | 14.423 | 4.10 | 1.59522 | 67.7 |
| 28 | −544.070 | 2.43 | | |
| 29 | ∞ | 1.72 | 1.51633 | 64.1 |
| 30 | ∞ | 2.07 | | |
| Image plane | ∞ | | | |

Aspherical surface data

Second surface (diffraction surface)

A2 = −1.09192e−004

Twenty-second surface

K = −3.40940e−001    A4 = −2.84570e−005

Twenty-third surface

K = −5.83413e−001    A4 = 3.95747e−005

Various data
Zoom ratio 30.00

| | Wide angle | Intermediate | Telephoto |
|---|---|---|---|
| Focal length | 6.98 | 29.90 | 209.46 |
| F-number | 1.90 | 3.80 | 4.90 |
| Half angle of view (degrees) | 43.10 | 10.30 | 1.48 |
| Image height | 5.50 | 5.50 | 5.50 |
| Total lens length | 139.40 | 139.40 | 139.40 |
| BF | 5.64 | 5.64 | 5.64 |
| d5 | 2.65 | 31.75 | 52.93 |
| d13 | 29.46 | 13.10 | 1.19 |
| d14 | 27.86 | 9.60 | 0.60 |
| d23 | 2.00 | 12.56 | 5.60 |
| d26 | 22.55 | 17.51 | 24.21 |

Zoom lens unit data

| Unit | First surface | Focal length |
|---|---|---|
| 1 | 1 | 70.39 |
| 2 | 6 | −10.00 |
| 3 | 15 | 23.11 |
| 4 | 24 | −30.44 |
| 5 | 27 | 23.67 |

Numerical data 3
Unit: mm

Surface data

| Surface number | ri | di | ndi | vdi |
|---|---|---|---|---|
| 1 | 69.602 | 1.50 | 1.85478 | 24.8 |
| 2 (Diffraction) | 40.415 | 5.75 | 1.59522 | 67.7 |
| 3 | 10,804.335 | 0.15 | | |
| 4 | 39.064 | 3.69 | 1.77250 | 49.6 |
| 5 | 106.867 | (Variable) | | |
| 6 | 178.012 | 0.65 | 2.00100 | 29.1 |
| 7 | 9.122 | 3.59 | | |
| 8* | −32.588 | 0.80 | 1.77250 | 49.6 |
| 9* | 256.508 | 0.89 | | |
| 10 | −24.180 | 0.50 | 1.77250 | 49.6 |
| 11 | 41.725 | 0.27 | | |
| 12 | 25.647 | 2.07 | 1.95906 | 17.5 |
| 13 | −48.769 | (Variable) | | |
| 14 (Stop) | ∞ | (Variable) | | |
| 15* | 15.618 | 2.13 | 1.88202 | 37.2 |
| 16* | 30.764 | 0.36 | | |
| 17 | 17.831 | 2.20 | 1.48749 | 70.2 |
| 18 | 95.246 | 1.46 | | |
| 19 | 12.595 | 1.75 | 1.49700 | 81.5 |
| 20 | 24.374 | 0.50 | 2.00069 | 25.5 |
| 21 | 9.079 | 0.50 | | |
| 22* | 9.807 | 3.69 | 1.49700 | 81.5 |
| 23* | −25.497 | (Variable) | | |
| 24 | 83.715 | 0.45 | 1.88300 | 40.8 |
| 25 | 9.362 | 1.00 | 1.89286 | 20.4 |
| 26 | 11.586 | (Variable) | | |
| 27 | 12.019 | 4.42 | 1.49700 | 81.5 |
| 28 | −45.752 | 2.20 | | |
| 29 | ∞ | 2.00 | 1.51633 | 64.1 |
| 30 | ∞ | 1.89 | | |
| Image plane | ∞ | | | |

Aspherical surface data

Second surface (diffraction surface)

A2 = −1.14561e−004    A4 = 2.27130e−008    A6 = −1.40452e−012
A8 = −6.27990e−014    A10 = 1.29981e−016

Eighth surface

K = 1.35569e+001    A4 = 1.59876e−005

Ninth surface

K = 2.01446e+000    A4 = −1.85010e−005

Fifteenth surface

K = 3.28120e−001    A4 = 2.24614e−005

Sixteenth surface

K = −1.20517e+000    A4 = 7.48060e−005

Twenty-second surface

K = 6.77110e−001    A4 = −9.70170e−005    A6 = −8.09418e−007
A8 = −2.96278e−008

Twenty-third surface

K = −3.85767e+001    A4 = −1.74290e−004    A6 = 8.18809e−006
A8 = −1.80674e−007    A10 = 2.44688e−009

Various data
Zoom ratio 26.00

| | Wide angle | Intermediate | Telephoto |
|---|---|---|---|
| Focal length | 5.86 | 29.97 | 152.27 |
| F-number | 2.06 | 3.70 | 4.30 |
| Half angle of view (degrees) | 43.50 | 10.20 | 2.05 |
| Image height | 4.67 | 5.50 | 5.50 |
| Total lens length | 95.31 | 96.56 | 99.37 |
| BF | 5.40 | 5.40 | 5.40 |
| d5 | 0.89 | 24.05 | 38.98 |
| d13 | 21.19 | 1.79 | 0.80 |
| d14 | 17.65 | 10.40 | 0.60 |
| d23 | 3.19 | 10.95 | 2.00 |
| d26 | 8.69 | 5.65 | 13.29 |

Zoom lens unit data

| Unit | First surface | Focal length |
|---|---|---|
| 1 | 1 | 53.74 |
| 2 | 6 | −8.22 |
| 3 | 15 | 15.29 |
| 4 | 24 | −15.43 |
| 5 | 27 | 19.65 |

Numerical data 4
Unit: mm

Surface data

| Surface number | ri | di | ndi | vdi |
|---|---|---|---|---|
| 1 | 59.852 | 1.50 | 1.85478 | 24.8 |
| 2 (Diffraction) | 27.983 | 5.24 | 1.77250 | 49.6 |
| 3 | 268.704 | 0.15 | | |
| 4 | 29.819 | 3.43 | 1.77250 | 49.6 |
| 5 | 82.932 | (Variable) | | |
| 6 | 55.366 | 0.65 | 1.88300 | 40.8 |
| 7 | 9.071 | 3.63 | | |
| 8* | −39.841 | 0.80 | 1.77250 | 49.6 |
| 9* | 27.440 | 1.49 | | |
| 10 | −19.872 | 0.50 | 1.69680 | 55.5 |
| 11 | 58.663 | 0.15 | | |
| 12 | 22.019 | 1.54 | 1.95906 | 17.5 |
| 13 | −289.561 | (Variable) | | |
| 14 (Stop) | ∞ | (Variable) | | |
| 15* | 15.138 | 1.99 | 1.88202 | 37.2 |
| 16* | 28.169 | 0.15 | | |
| 17 | 15.558 | 2.92 | 1.48749 | 70.2 |
| 18 | 306.569 | 0.14 | | |
| 19 | 17.001 | 1.50 | 1.49700 | 81.5 |
| 20 | 30.311 | 0.50 | 2.00069 | 25.5 |
| 21 | 10.427 | 0.50 | | |
| 22* | 11.222 | 4.30 | 1.49700 | 81.5 |
| 23* | −20.573 | (Variable) | | |
| 24 | 75.073 | 0.45 | 1.88300 | 40.8 |
| 25 | 8.478 | 1.18 | 1.89286 | 20.4 |
| 26 | 10.562 | (Variable) | | |
| 27 | 12.017 | 4.83 | 1.49700 | 81.5 |
| 28 | −32.234 | 1.00 | | |
| 29 | ∞ | 1.72 | 1.51633 | 64.1 |
| 30 | ∞ | 2.07 | | |
| Image plane | ∞ | | | |

Aspherical surface data

Second surface (diffraction surface)

A2 = −1.84525e−004   A4 = 5.32083e−008   A6 = 2.23509e−010
A8 = −1.41399e−012   A10 = 2.92039e−015

Eighth surface

K = 1.98933e+001   A4 = −4.81993e−005

Ninth surface

K = −2.06983e+001   A4 = 1.33845e−004

Fifteenth surface

K = 1.79500e−001   A4 = 2.05089e−005

Sixteenth surface

K = −1.21136e+000   A4 = 7.63723e−005

Twenty-second surface

K = 5.91566e−001   A4 = −1.04855e−004   A6 = −2.47074e−007
A8 = −1.83333e−008

Twenty-third surface

K = −1.40289e+001   A4 = −1.09200e−004   A6 = 3.84256e−006
A8 = −6.61160e−008   A10 = 6.78061e−010

Various data
Zoom ratio 18.01

| | Wide angle | Intermediate | Telephoto |
|---|---|---|---|
| Focal length | 8.02 | 21.98 | 144.47 |
| F-number | 2.20 | 3.80 | 4.60 |
| Half angle of view (degrees) | 37.30 | 13.80 | 2.16 |
| Image height | 5.50 | 5.50 | 5.50 |
| Total lens length | 86.41 | 86.41 | 86.41 |
| BF | 4.21 | 4.21 | 4.21 |
| d5 | 0.93 | 12.25 | 25.10 |
| d13 | 13.35 | 2.23 | 0.79 |
| d14 | 15.92 | 13.36 | 0.59 |
| d23 | 5.16 | 9.69 | 1.99 |
| d26 | 9.31 | 7.13 | 16.20 |

Zoom lens unit data

| Unit | First surface | Focal length |
|---|---|---|
| 1 | 1 | 39.36 |
| 2 | 6 | −7.16 |
| 3 | 15 | 14.59 |
| 4 | 24 | −14.15 |
| 5 | 27 | 18.28 |

Numerical data 5
Unit: mm

Surface data

| Surface number | ri | di | ndi | vdi |
|---|---|---|---|---|
| 1 | 49.430 | 1.35 | 1.85478 | 24.8 |
| 2 (Diffraction) | 30.048 | 7.15 | 1.62299 | 58.2 |
| 3 | 312.657 | 0.15 | | |
| 4 | 33.303 | 3.28 | 1.69680 | 55.5 |
| 5 | 95.941 | (Variable) | | |
| 6 | 90.907 | 0.80 | 1.83481 | 42.7 |
| 7 | 7.616 | 3.55 | | |
| 8 | 43.227 | 0.60 | 1.76385 | 48.5 |
| 9 | 13.074 | 2.70 | | |
| 10 | −23.176 | 0.60 | 1.69680 | 55.5 |
| 11 | 39.227 | 0.10 | | |
| 12 | 18.960 | 1.92 | 1.92286 | 18.9 |
| 13 | −371.553 | (Variable) | | |
| 14 (Stop) | ∞ | (Variable) | | |
| 15* | 10.558 | 5.05 | 1.49700 | 81.5 |
| 16* | −57.427 | 6.10 | | |
| 17 | 60.983 | 0.60 | 1.95375 | 32.3 |
| 18 | 9.452 | 2.47 | 1.49700 | 81.5 |
| 19 | 116.223 | 0.38 | | |
| 20* | 8.060 | 2.83 | 1.49700 | 81.5 |
| 21* | −31.288 | (Variable) | | |
| 22 | −60.844 | 0.40 | 1.85150 | 40.8 |
| 23 | 8.477 | (Variable) | | |
| 24 | 18.199 | 1.97 | 1.91082 | 35.3 |
| 25 | −22.005 | 2.49 | | |
| 26 | ∞ | 1.75 | 1.51633 | 64.1 |
| 27 | ∞ | 0.50 | | |
| Image plane | ∞ | | | |

Diffraction surface data

Second surface (diffraction surface)

C2 = −1.10388e−004   C4 = 6.25615e−008   C6 = −6.95772e−011
C8 = 1.48193e−014

Aspherical surface data

Fifteenth surface

K = −1.66800e+000   A4 = 1.08233e−004   A6 = −2.32732e−007
A8 = 3.89330e−009   A10 = −2.28046e−011

Sixteenth surface

K = 0.00000e+000   A4 = 2.37556e−005   A6 = 1.67969e−008

-continued

Numerical data 5
Unit: mm

Twentieth surface

K = 0.00000e+000   A4 = −1.85236e−004   A6 = −1.31069e−006
A8 = −8.89070e−008   A10 = 1.06936e−009
Twenty-first surface K = 0.00000e+000   A4 = 1.78207e−004   A6 = −1.32686e−006

Various data
Zoom ratio 39.58

|  | Wide angle | Intermediate | Telephoto |
|---|---|---|---|
| Focal length | 3.92 | 41.78 | 155.08 |
| F-number | 1.65 | 3.00 | 4.93 |
| Half angle of view (degrees) | 39.24 | 4.38 | 1.18 |
| Image height | 3.20 | 3.20 | 3.20 |
| Total lens length | 92.36 | 92.36 | 92.36 |
| BF | 4.15 | 4.15 | 4.15 |
| d5 | 0.59 | 26.99 | 32.78 |
| d13 | 33.08 | 6.69 | 0.89 |
| d14 | 6.07 | 0.74 | 0.70 |
| d21 | 3.86 | 9.09 | 1.98 |
| d23 | 2.59 | 2.70 | 9.85 |

Zoom lens unit data

| Unit | First surface | Focal length |
|---|---|---|
| 1 | 1 | 46.99 |
| 2 | 6 | −6.83 |
| 3 | 15 | 14.94 |
| 4 | 22 | −8.71 |
| 5 | 24 | 11.20 |

Numerical data 6
Unit: mm

Surface data

| Surface number | r | d | nd | vd |
|---|---|---|---|---|
| 1 | 69.351 | 2.00 | 1.85478 | 24.8 |
| 2 (Diffraction) | 43.541 | 8.92 | 1.62299 | 58.2 |
| 3 | 1,332.553 | 0.15 | | |
| 4 | 43.706 | 3.93 | 1.60311 | 60.6 |
| 5 | 103.689 | (Variable) | | |
| 6 | 85.460 | 0.90 | 1.91082 | 35.3 |
| 7 | 9.503 | 4.33 | | |
| 8 | 78.594 | 0.60 | 1.76385 | 48.5 |
| 9 | 20.075 | 2.88 | | |
| 10 | −25.065 | 0.60 | 1.60311 | 60.6 |
| 11 | 42.578 | 0.10 | | |
| 12 | 24.418 | 2.19 | 1.95906 | 17.5 |
| 13 | −317.091 | (Variable) | | |
| 14 (Stop) | ∞ | (Variable) | | |
| 15* | 10.776 | 5.85 | 1.49700 | 81.5 |
| 16* | −53.713 | 4.92 | | |
| 17 | 37.985 | 2.20 | 1.43700 | 95.1 |
| 18 | −24.436 | 0.60 | 1.95375 | 32.3 |
| 19 | 19.813 | 2.56 | | |
| 20* | 8.232 | 2.81 | 1.49700 | 81.5 |
| 21* | −28.478 | (Variable) | | |
| 22 | −45.764 | 0.40 | 1.85150 | 40.8 |
| 23 | 8.849 | (Variable) | | |
| 24 | 16.665 | 2.16 | 1.91082 | 35.3 |
| 25 | −22.683 | 2.48 | | |
| 26 | ∞ | 1.75 | 1.51633 | 64.1 |
| 27 | ∞ | 0.50 | | |
| Image plane | ∞ | | | |

Diffraction surface data

Second surface (diffraction surface)

A2 = −7.65163e−005   A4 = 2.62734e−008   A6 = −2.37848e−011
A8 = 1.48193e−014

Aspherical surface data

Fifteenth surface

K = −1.32628e+000   A4 = 7.80039e−005   A6 = 1.42926e−007
A8 = −8.50572e−011   A10 = 1.30037e−011
Sixteenth surface K = 0.00000e+000   A4 = 2.04044e−005   A6 = 8.58515e−008
Twentieth surface K = 0.00000e+000   A4 = −1.95337e−004   A6 = −1.56355e−006
A8 = 5.75894e−008   A10 = −1.48501e−009
Twenty-first surface K = 0.00000e+000   A4 = 2.34513e−004   A6 = 7.89634e−007

Various data
Zoom ratio 64.27

|  | Wide angle | Intermediate | Telephoto |
|---|---|---|---|
| Focal length | 3.77 | 51.81 | 242.40 |
| F-number | 1.65 | 3.00 | 6.50 |
| Half angle of view (degrees) | 40.31 | 3.53 | 0.76 |
| Image height | 3.20 | 3.20 | 3.20 |
| Total lens length | 119.38 | 119.38 | 119.38 |
| BF | 4.14 | 4.14 | 4.14 |
| d5 | 0.60 | 41.50 | 50.48 |
| d13 | 50.78 | 9.88 | 0.90 |
| d14 | 9.35 | 1.45 | 0.70 |
| d21 | 4.32 | 10.71 | 1.97 |
| d23 | 2.09 | 3.60 | 13.09 |

Zoom lens unit data

| Unit | First surface | Focal length |
|---|---|---|
| 1 | 1 | 68.42 |
| 2 | 6 | −8.76 |
| 3 | 15 | 17.80 |
| 4 | 22 | −8.68 |
| 5 | 24 | 10.83 |

TABLE 1

| Parameter/Conditional Expression | Example 1 | Example 2 | Example 3 | Example 4 | Example 5 | Example 6 |
|---|---|---|---|---|---|---|
| f1 | 46.77 | 70.39 | 53.74 | 39.36 | 46.99 | 68.42 |
| m2 | 31.34 | 50.28 | 34.03 | 24.16 | 32.19 | 49.88 |
| BFw | 5.69 | 5.64 | 5.40 | 4.21 | 4.15 | 4.14 |
| f2 | −8.10 | −10.00 | −8.22 | −7.16 | −6.83 | −8.76 |
| TDt | 89.99 | 139.99 | 100.05 | 87.00 | 92.96 | 119.97 |
| TDw | 89.99 | 139.99 | 95.99 | 87.00 | 92.96 | 119.97 |
| fdoe | 3,064.5 | 4,579.1 | 4,364.5 | 2,709.7 | 4,529.5 | 6,534.6 |
| ndlp | 1.77 | 1.77 | 1.60 | 1.77 | 1.62 | 1.60 |
| fw | 6.40 | 6.98 | 5.86 | 8.02 | 3.92 | 3.77 |
| ft | 122.14 | 209.46 | 152.27 | 144.47 | 155.08 | 242.40 |
| Y | 5.50 | 5.50 | 5.50 | 5.50 | 3.20 | 3.20 |
| Conditional Expression (1) | 1.49 | 1.40 | 1.58 | 1.63 | 1.46 | 1.37 |
| Conditional Expression (2) | 0.12 | 0.08 | 0.10 | 0.11 | 0.09 | 0.06 |
| Conditional Expression (3) | −5.78 | −7.04 | −6.54 | −5.50 | −6.88 | −7.81 |
| Conditional Expression (4) | 1.00 | 1.00 | 1.04 | 1.00 | 1.00 | 1.00 |
| Conditional Expression (5) | 65.52 | 65.05 | 81.22 | 68.84 | 96.38 | 95.50 |
| Conditional Expression (6) | 1.77 | 1.77 | 1.60 | 1.77 | 1.62 | 1.60 |
| Conditional Expression (7) | −1.27 | −1.43 | −1.40 | −0.89 | −1.74 | −2.32 |
| Conditional Expression (8) | 0.38 | 0.34 | 0.35 | 0.27 | 0.30 | 0.28 |
| Conditional Expression (9) | 0.061 | 0.039 | 0.055 | 0.063 | 0.034 | 0.027 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-081259, filed Apr. 17, 2017, which is hereby incorporated by reference herein in its entirety.

What is claimed is:

1. A zoom lens comprising in order from an object side to an image side:

a first lens unit having a positive refractive power;
a second lens unit having a negative refractive power; and
a rear group including at least one lens unit,
wherein the second lens unit is configured to move for zooming,
wherein an interval between each pair of adjacent lens units is changed for zooming,
wherein the rear group has a positive refractive power over an entire zoom range,
wherein the first lens unit includes a diffraction surface formed at a cemented surface of two optical elements cemented to each other, and
wherein conditional expressions $1.00 < f1/m2 \leq 1.58$; and $0.05 < BFw/f1 < 0.15$; and $0.1 < f1/ft < 0.4$ are satisfied where f1 represents a focal length of the first lens unit, m2 represents an amount of movement of the second lens unit for zooming from a wide angle end to a telephoto end, BFw represents a back focus at the wide angle end, and ft represents a focal length of the zoom lens at the telephoto end.

2. The zoom lens according to claim 1, wherein a conditional expression $-9.0 < f1/f2 < -3.0$ is satisfied where f2 represents a focal length of the second lens unit.

3. The zoom lens according to claim 1, wherein a conditional expression $0.95 < TDt/TDw < 1.20$ is satisfied where TDw represents a total length of the zoom lens at the wide angle end, and TDt represents a total length of the zoom lens at the telephoto end.

4. The zoom lens according to claim 1, wherein a conditional expression $20.0 < fdoe/f1 < 500.0$ is satisfied where fdoe represents a focal length of the diffraction surface.

5. The zoom lens according to claim 1, wherein the first lens unit includes, in order from the object side to the image side, a negative lens G11 and a positive lens G12, which are cemented to each other, and a positive lens G13, and
wherein the diffraction surface is formed at a cemented surface of the negative lens G11 and the positive lens G12.

6. The zoom lens according to claim 1,
wherein the first lens unit includes a plurality of positive lenses, and
wherein a conditional expression $ndlp > 1.55$ is satisfied where ndlp represents a minimum value among refractive indices of materials of the plurality of positive lenses.

7. The zoom lens according to claim 1, wherein the rear group includes, in order from the object side to the image side, a third lens unit having a positive refractive power, a fourth lens unit, and a fifth lens unit,
   wherein the third lens unit is configured to move for zooming, and
   wherein the fourth lens unit is configured to move for zooming.

8. The zoom lens according to claim 1, wherein a conditional expression $$-3.0 < f2/fw < -0.4$$

is satisfied where f2 represents a focal length of the second lens unit, and fw represents a focal length of the zoom lens at the wide angle end.

9. The zoom lens according to claim 1, wherein a conditional expression $$1.35 < f1/m2 < 1.65$$

is satisfied.

10. The zoom lens according to claim 1, wherein a conditional expression $$0.05 < BFw/f1 < 0.13$$

is satisfied.

11. An image pickup apparatus comprising:
   a zoom lens; and
   an image pickup element configured to receive light of an image formed by the zoom lens,
   wherein the zoom lens comprises in order from an object side to an image side:
      a first lens unit having a positive refractive power;
      a second lens unit having a negative refractive power; and
      a rear group including at least one lens unit,
   wherein the second lens unit is configured to move for zooming,
   wherein an interval between each pair of adjacent lens units is changed for zooming,
   wherein the rear group has a positive refractive power over an entire zoom range,
   wherein the first lens unit includes a diffraction surface formed at a cemented surface of two optical elements cemented to each other, and
   wherein conditional expressions $$1.00 < f1/m \leq 1.58;$$

$$0.05 < BFw/f1 < 0.15; \text{ and}$$

$$0.1 < f1/ft < 0.4$$

are satisfied where f1 represents a focal length of the first lens unit, m2 represents an amount of movement of the second lens unit for zooming from a wide angle end to a telephoto end, BFw represents a back focus at the wide angle end, and ft represents a focal length of the zoom lens at the telephoto end.

12. The image pickup apparatus according to claim 11, wherein a conditional expression $$0.015 < Y/TDt < 0.100$$

is satisfied where TDt represents a total length of the zoom lens at the telephoto end, and Y represents a maximum image height.

13. The image pickup apparatus according to claim 11, further comprising a corrector configured to electrically correct the image to compensate for an aberration of the zoom lens.

14. The image pickup apparatus according to claim 11, further comprising:
   a control unit configured to control the zoom lens.

15. The image pickup apparatus according to claim 14, further comprising a transmitter configured to transmit a control signal for controlling the zoom lens.

16. The image pickup apparatus according to claim 11, further comprising an operation unit for use in operation of the zoom lens.

17. The image pickup apparatus according to claim 11, further comprising a display configured to display information related to zooming of the zoom lens.

* * * * *